(12) United States Patent
Benjebbour et al.

(10) Patent No.: US 9,385,892 B2
(45) Date of Patent: *Jul. 5, 2016

(54) COMMUNICATION SYSTEM, TRANSMITTING DEVICE, RECEIVING DEVICE, AND COMMUNICATION METHOD

(71) Applicant: NTT DoCoMo, Inc., Chiyoda-ku, Tokyo (JP)

(72) Inventors: Anass Benjebbour, Yokosuka (JP); Takahiro Asai, Yokosuka (JP); Hitoshi Yoshino, Yokosuka (JP); Tatsuo Furuno, Yokohama (JP); Tomoyuki Ooya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 335 days.

This patent is subject to a terminal disclaimer.

(21) Appl. No.: 13/890,992

(22) Filed: May 9, 2013

(65) Prior Publication Data

US 2013/0322362 A1 Dec. 5, 2013

Related U.S. Application Data

(63) Continuation of application No. 12/531,483, filed as application No. PCT/JP2008/054504 on Mar. 12, 2008, now Pat. No. 8,588,325.

(30) Foreign Application Priority Data

Mar. 16, 2007 (JP) ................................ 2007-068444

(51) Int. Cl.
*H04W 72/04* (2009.01)
*H04L 25/03* (2006.01)
(Continued)

(52) U.S. Cl.
CPC ........ *H04L 25/03006* (2013.01); *H04L 5/0005* (2013.01); *H04L 25/03821* (2013.01);
(Continued)

(58) Field of Classification Search
CPC .................... H04L 27/2649; H04L 25/03006; H04L 2025/03414; H04L 27/2602
See application file for complete search history.

(56) References Cited

U.S. PATENT DOCUMENTS

| | | |
|---|---|---|
| 3,511,936 A | 5/1970 | Saltzberg |
| 6,574,456 B2 * | 6/2003 | Hamabe ...................... 455/63.3 |

(Continued)

FOREIGN PATENT DOCUMENTS

| | | | |
|---|---|---|---|
| EP | 1 744 481 | * 1/2007 | .............. H04J 11/00 |
| JP | 11-150485 A | 6/1999 | |

(Continued)

OTHER PUBLICATIONS

Benejbbour et al. "Pulse Shaping for Cyclostationarity-Exploiting Partially Coordinated Spectrum Sharing", Sep. 2008, IEEE, pp. 1-5.*

(Continued)

*Primary Examiner* — Sophia Vlahos
(74) *Attorney, Agent, or Firm* — Crowell & Moring LLP

(57) ABSTRACT

There is provided a communication system capable of achieving a high usage efficiency of frequencies without the need for cooperation of multiplexed users. A communication system communicates over frequency channels set by dividing a frequency bandwidth assigned to the system allows interference between channels by overlapping the adjacent frequency channels with each other in the frequency domain, or a transmitting and receiving device, which transmits and receives a signal by allowing the interference between symbols at a waveform level for each channel to decrease the occupied bandwidth, is provided with ICI removal and ISI compensation filter 111 serving as either an ICI removal filter for removing the interference between channels or an ISI compensation filter for compensating the interference between symbols.

3 Claims, 18 Drawing Sheets

(51) Int. Cl.
*H04L 27/26* (2006.01)
*H04L 5/00* (2006.01)

(52) U.S. Cl.
CPC ...... *H04L25/03834* (2013.01); *H04L 27/2602* (2013.01); *H04L 5/0044* (2013.01); *H04L 2025/03414* (2013.01); *H04L 2025/03509* (2013.01)

(56) References Cited

U.S. PATENT DOCUMENTS

| | | | | |
|---|---|---|---|---|
| 6,693,984 | B1* | 2/2004 | Andre | 375/350 |
| 7,274,744 | B2 | 9/2007 | Lozhkin | |
| 8,050,338 | B2* | 11/2011 | Wilhelmsson | 375/260 |
| 8,588,325 | B2* | 11/2013 | Benjebbour et al. | 375/285 |
| 2002/0039388 | A1* | 4/2002 | Smart et al. | 375/260 |
| 2002/0128014 | A1* | 9/2002 | Chen | 455/447 |
| 2004/0091057 | A1* | 5/2004 | Yoshida | 375/260 |
| 2004/0162097 | A1* | 8/2004 | Vijayan et al. | 455/522 |
| 2005/0002324 | A1* | 1/2005 | Sutivong et al. | 370/208 |
| 2006/0109931 | A1* | 5/2006 | Asai et al. | 375/299 |
| 2009/0110087 | A1* | 4/2009 | Liu et al. | 375/260 |

FOREIGN PATENT DOCUMENTS

| | | |
|---|---|---|
| JP | 2000-151530 A | 5/2000 |
| JP | 2003-087070 A | 3/2003 |
| JP | 2004-266814 A | 9/2004 |
| JP | 2005-079911 A | 3/2005 |
| WO | WO 2004/023685 A1 | 3/2004 |

OTHER PUBLICATIONS

European Search Report dated Jul. 2, 2013 (Ten (10) pages).
M.B. Furtado, Jr. et al., "Time-Domain Constraints for the Design of FRM-Based Cosine-Modulated and Modified DFT Filter Banks with Large Number of Bands and Zero Intersymbol Interference", Proceedings, 2004 IEEE International Symposium on Circuits and Systems, ISCAS 2004, pp. III-189-III-192, May 23, 2004.
PCT/JP2008/054504 PCT/ISA/210 International Search Report.
S.B. Weinstein, et al., "Data Transmission by Frequency-Division Multiplexing Using the Discrete Fourier Transform", IEEE Transactions on Communication Technology, vol. Com-19, No. 5, Oct. 1971, pp. 628-634.
Burton R. Saltzberg, "Performance of an Efficient Parallel Data Transmission System", IEEE Transactions on Communication Technology, vol. Com-15, No. 6, Dec. 1967, pp. 805-811.
J.G. Proakis, "Digital Communications", Chapter Fifteeen: Multiuser Communications, International Edition 2001, ISBN 0-07-118183-0, McGraw-Hill Higher Education, New York, New York, pp. 896-899.
J.G. Proakis, "Digital Communications", Chapter Nine: Signal Design for Band-Limited Channels,International Edition 2001, ISBN 0-07-118183-0, McGraw-Hill Higher Educatiion, New York, New York, pp. 560-569.
Taiwan Office Action w/Translation, dated Jan. 6, 2012, 7 pages total.
William A. Gardner, "Exploitation of Spectral Redundancy in Cyclostationary Signals", IEEE Signal Processing Magazine, Apr. 1991, vol. 8, No. 2, pp. 14-36.
William A. Gardner, "Cyclic Wiener Filtering: Theory and Method", IEEE Transactions on Communications, Jan. 1993, pp. 151-163, vol. 41, No. 1.
Japanese Office Action dated Aug. 3, 2010 w/Translation (7 pages).
PCT/JP2008/054504 PCT/IB/338.
PCT/JP2008/054504 PCT/IB/373.
PCT/JP2008/054504 PCT/ISA/237.

* cited by examiner

PRIOR ART

PRIOR ART

F I G. 1 1 A
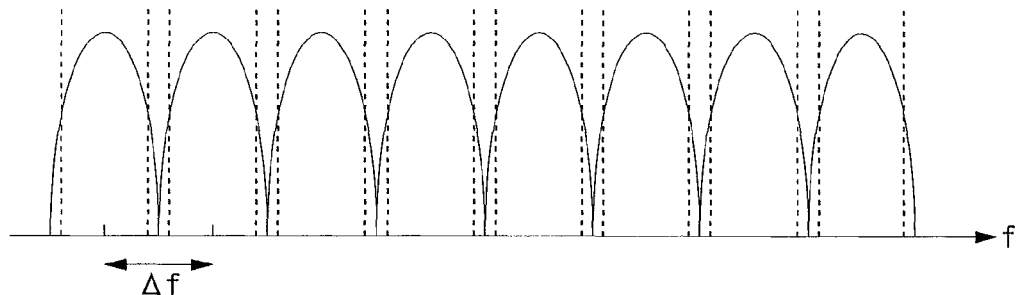
F I G. 1 1 B
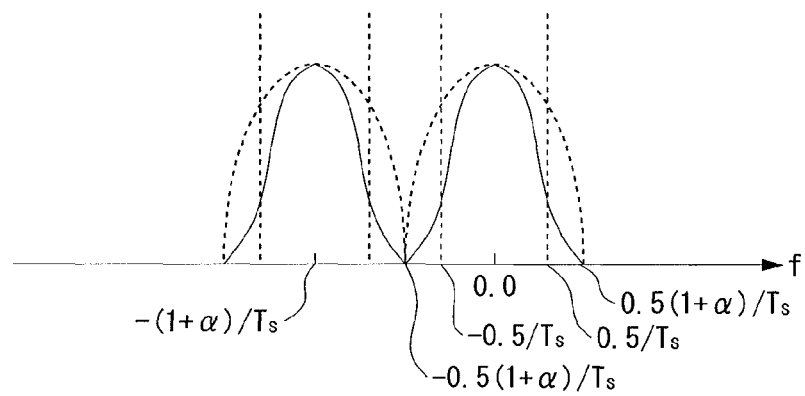
F I G. 1 1 C
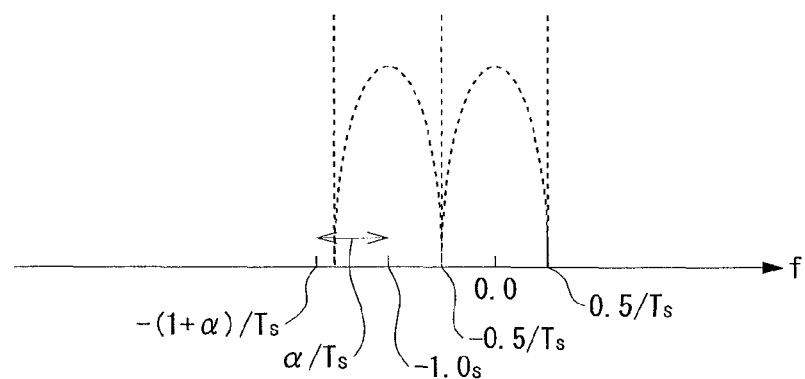

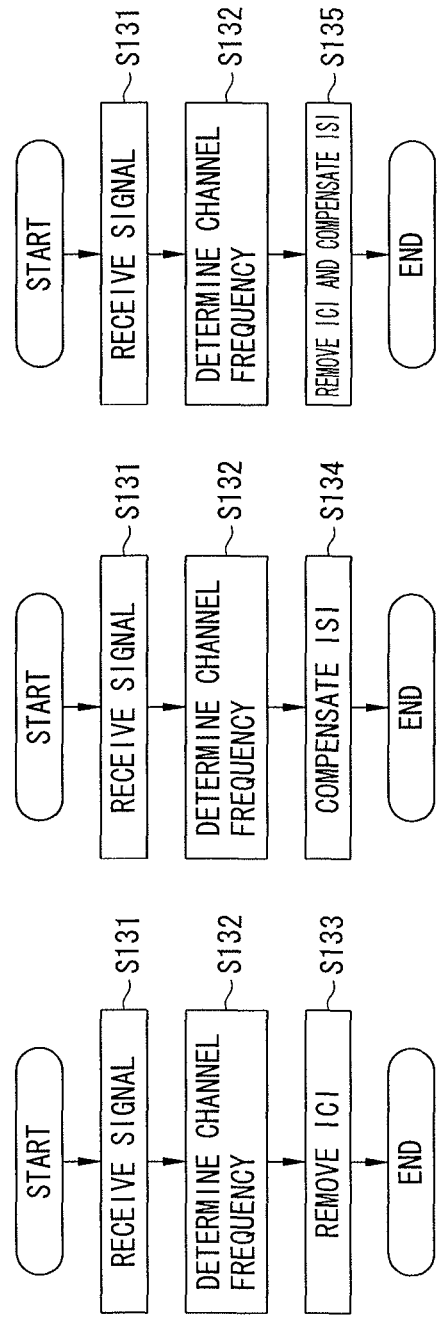

FIG. 16

| | CONVENTIONAL METHOD 1 | CONVENTIONAL METHOD 2 | PROPOSED METHOD 1 | PROPOSED METHOD 2 | PROPOSED METHOD 3 |
|---|---|---|---|---|---|
| FREQUENCY USAGE EFFICIENCY | LOW | MEDIUM | MEDIUM | HIGH | HIGH |
| PULSE TEMPORAL DISPERSION | LOW | HIGH | LOW | LOW | LOW |
| INTER-CHANNEL INTERFERENCE (ICI) | NONE | NONE | ALLOWED (INTERFERENCE IS REMOVED AT THE RECEIVING SIDE) | NONE | ALLOWED (INTERFERENCE IS REMOVED AT THE RECEIVING SIDE) |
| INTER-SYMBOL INTERFERENCE (ISI) | NONE | NONE | NONE | ALLOWED (ISI IS COMPENSATED AT THE RECEIVING SIDE) | ALLOWED (ISI IS COMPENSATED AT THE RECEIVING SIDE) |

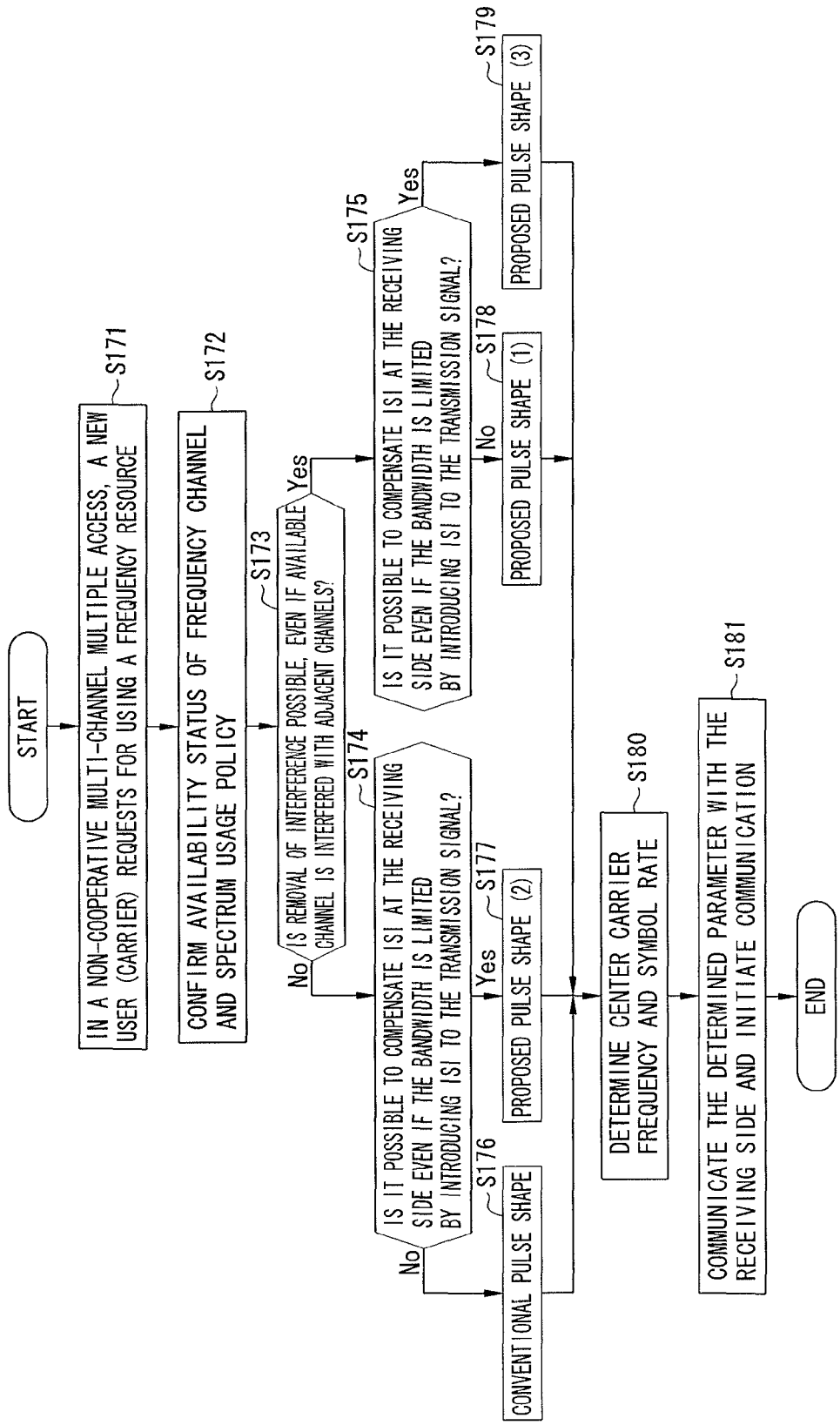

PRIOR ART

PRIOR ART

COMMUNICATION SYSTEM, TRANSMITTING DEVICE, RECEIVING DEVICE, AND COMMUNICATION METHOD

TECHNICAL FIELD

The present invention relates to communication systems, transmitting devices, receiving devices, and communication methods, and more specifically, to a communication system, transmitting device, receiving device, and communication method, applied to an environment in which a single or multiple frequency channels are used for communication, without the need for cooperation among multiplexed users.

BACKGROUND ART

Signals from multiple users are multiplexed and transmitted to a base transceiver station. The multiplexing technique is also referred to as multiple access. As a method for multiple access, FDMA (Frequency Division Multiple Access) and OFDMA (Orthogonal Frequency Division Multiple Access) are well known. FDMA is a method of dividing the frequency range with a limited spectrum over a frequency axis, assigning the divided frequencies to respective users, and multiplexing the frequencies for transmission. OFDMA is translated as orthogonal frequency division multiplexing, and is a method of orthogonalizing the spectrums of adjacent channels with each other.

As known documents describing OFDMA, for example, there are Non-Patent Document 1 and Non-Patent Document 2. As known documents describing FDMA, for example, there are Non-Patent Document 3 and Non-Patent Document 4.

In each of OFDMA and FDMA, since multiple data streams are transmitted in parallel, each stream is transmitted over a single frequency channel. For this reason, in order to prevent the interference between the respective frequency channels (frequency bands), the configuration will be made as described below.

FIG. 20 shows frequency spectrums of OFDMA. FIG. 20 shows a case where there are six frequency channels in the system overall bandwidth $W_1$, as an example of OFDMA frequency spectrums. According to OFDMA, multiple users (user 1 to user M) each transmit data by use of some of the multiple spectrums shown in FIG. 20. (FIG. 20 shows an example case where the user 1 uses two frequency channels, the user k uses a single frequency channel, and the user M uses three frequency channels.) In OFDMA, by overlapping adjacent frequency channels, the entire system bandwidth can be made small and the usage efficiency of the spectrum can be improved. However, to maintain orthogonality of adjacent frequency channels, constraints on the time synchronization of the multiplexed users are to be met. Non-Patent Document 1 and Non-Patent Document 2 describe that when the users cannot keep cooperation in transmission, the orthogonality of signals is destroyed and the characteristics of data transmission is significantly degraded.

FIG. 21 shows frequency spectrums of FDMA. FIG. 21 shows a case where there are six frequency channels in the system bandwidth $W_2$, as an example of FDMA frequency spectrums. As described in Non-Patent Document 3, in FDMA, guard bands are provided between adjacent frequency channels to prevent the interference between the frequency channels to be used by the respective users. As a result, the entire system bandwidth of the FDMA system is greater than that of the OFDMA system, whereas the FDMA system has an advantage of eliminating the constraints on temporal synchronization among users. Nevertheless, the signal waveform that avoids the Inter-Symbol Interference in each frequency channel has to be employed for the FDMA system to maintain the signal quality in each channel. In order to avoid Inter-Symbol Interference at such a waveform level, the pulse waveforms of the signals are shaped based upon Nyquist criterion.

In FDMA, it is desirable to make smaller the intervals between the frequency channels, so that the frequency use efficiency is improved by making smaller the entire system bandwidth. For instance, FIG. 22 shows a case where the intervals between the frequency channels are made narrower by making the guard bands smaller. FIG. 23 shows a case where the intervals between the frequency channels are made narrower by making steep the pulse waveform of each frequency channel. Additionally, Non-Patent Document 4 describes a method of making narrower the bandwidth occupied by each frequency channel by employing Partial Response method that intentionally introduces Inter-Symbol Interference at the information symbol level.

Incidentally, the signal is shaped by a pulse shaping filter. However, when the signals are shaped by a filter with a sharp frequency response at the frequency domain as shown in FIG. 23, the time responses will be greatly dispersed at the time domain, making it difficult to design such a filter in practice. Accordingly, for shaping the pulses, a trade-off relationship exists between the shape in the frequency domain and the magnitude of the temporal dispersion of the shaped pulses in the time domain.

Non-Patent Document 1: S. B. Weinstem and P. M. Ebet, "Data transmission by frequency-division multiplexing using the discrete Fourier transform," IEEE Trans. Commun., vol. 19, no. 5, pp. 628-634, October 1971.

Non-Patent Document 2: Burton R. Saltzberg, "Performance of an efficient parallel data transmission system," IEEE Trans. Commun., vol. 15, no. 6, pp. 805-811, December 1967.

Non-Patent Document 3: J. G Proakis, "Digital Communications," pp. 897-899.

Non-Patent Document 4: J. G Proakis, "Digital Communications," pp. 561-568.

PROBLEMS TO BE SOLVED BY THE INVENTION

It should be noted that, however, it is difficult to sufficiently improve the spectrum usage efficiency in the conventional FDMA with the guard bands. That is, in shaping the waveforms, the steep frequency response may decrease the entire system bandwidth, but the possibility of achieving the pulse shaping filter is difficult in consideration of the causality of its temporal response. Therefore, the frequency response has to be made smooth, thereby resulting in the difficulty in making the entire system bandwidth sufficiently small.

On the other hand, it is possible to make the entire system bandwidth small when OFDMA is employed. However, constraints on the time synchronization have to be met among users, thereby necessitating the cooperation between multiple users.

Furthermore, in a case where the bandwidth in each frequency channel is made narrower by use of the Partial Response method, the receiving device is subject to a drawback in that error propagation occurs when the symbol is decoded and the reception characteristics are degraded, due to the induced ISI (Inter-Symbol Interference) observed at the symbol level of the received signal.

It is an object of the present invention to provide a communication system, transmitting device, receiving device, and communication method, whereby multiple users do not have to cooperate with each other and high frequency usage efficiency is achievable.

MEANS FOR SOLVING THE PROBLEMS

In order to solve the above problems, according to an aspect of the present invention, there is provided a communication system that communicates over frequency channels set by dividing a frequency bandwidth assigned to the system, the communication system comprising: a transmitting device that transmits a signal in which Inter-Channel Interference is allowed by purposely overlapping among the frequency channels adjacent to each other in a frequency domain; and a receiving device that receives the signal transmitted from the transmitting device, the receiving device comprising ICI removal means that removes the Inter-Channel Interference, owing to overlapping adjacent frequency channels with each other, allowed at the signal transmitted. According to an aspect of the present invention, the transmitting device transmits the signal by overlapping multiple frequency channels with each other, thereby making the frequency bandwidth assigned to the system available to other channels and improving the usage of the spectrum efficient. Also, the receiving device is capable of removing the interference generated on the overlapping frequency regions between frequency channels, thereby preventing the degradation in the signal quality of received signal.

According to another aspect of the present invention, there is provided a communication system that communicates over frequency channels set by dividing a frequency bandwidth assigned to the system, the communication system comprising: a transmitting device that transmits a signal in which Inter-Symbol Interference at a waveform level for each of the frequency channels is allowed; and a receiving device that receives the signal transmitted from the transmitting device, the receiving device comprising ISI compensation means that compensates Inter-Symbol Interference at the waveform level between the symbols for each of the frequency channels of the signal transmitted. According to an aspect of the present invention, the transmitting device is capable of transmitting the signal with a pulse that does not satisfy the zero ISI condition, thereby decreasing the bandwidth of each frequency channel. Consequently, the frequency bandwidth assigned to the system can be used by more frequency channels, thereby improving the efficiency usage of the spectrum. In addition, in shaping the pulse, the zero ISI condition does not have to be considered, thereby improving the design flexibility of the filter for pulse shaping.

Further, since the receiving side is capable of compensating ISI, the degradation in the signal quality of the received signal can be prevented.

According to another further aspect of the present invention, there is provided a communication system that communicates over frequency channels set by dividing a frequency bandwidth assigned to the system, the communication system comprising: a transmitting device that transmits a signal; a receiving device that receives the signal transmitted from the transmitting device; a spectrum usage information and policy information acquiring portion that has a function to detect a bandwidth of a frequency channel that is not being currently used and to determine usage status of that frequency channel; a pulse shape and symbol rate controller that determines whether or not a user allows ISI and whether or not an adjacent frequency channel for another user is interfered, based upon the information acquired by the spectrum usage information and policy information acquiring portion, and that determines at least one of a center carrier frequency, a symbol rate, and a pulse shape, based upon a determination result; and a center carrier frequency controller that controls a center carrier frequency of the signal transmitted with the use of a center carrier frequency determined by the pulse shape and symbol rate controller. According to an aspect of the present invention, the transmitting device is capable of detecting the bandwidth of the frequency channel that is not being currently used, determining whether or not it is possible to allow the frequency channel, for another user, adjacent to the frequency channel to interfere with the frequency channel, and determining at least one of the center carrier frequency, symbol rate, the shaped pulse of the signal to be transmitted, based on the above determination. Accordingly, it is possible to transmit the signal with a pulse shape of a high usage efficiency of the spectrum according to the usage status of the spectrum, while the signal quality of the received signal is being considered.

According to yet another aspect of the present invention, there is provided a transmitting device that communicates over frequency channels set by dividing a frequency bandwidth assigned to a system, the transmitting device comprising signal transmission means that transmits a signal in which adjacent frequency channels are overlapped with each other in a frequency domain. According to an aspect of the present invention, the usage efficiency of the spectrum to be used for communication can be improved.

In the above transmitting device, the signal transmission means sets overlapping between the frequency channels of the signal within an excessive bandwidth of a frequency channel. According to an aspect of the present invention, the interference between frequency channels can be suppressed within a range where the receiving side is capable of removing.

According to yet another aspect of the present invention, there is provided a transmitting device that communicates over frequency channels set by dividing a frequency bandwidth assigned to a system, the transmitting device comprising signal transmission means that transmits over a frequency channel a signal in which ISI is allowed. According to an aspect of the present invention, it is possible to improve the usage efficiency of the spectrum to be used for communication and it is also possible to improve the possibility of the filter for shaping the pulse of the frequency channel.

In the above transmitting device, the signal transmission means transmits the signal in which the ISI is allowed and in which the bandwidth of the frequency channel is limited by a pulse shaping filter to Nyquist bandwidth as a lower limit. According to an aspect of the present invention, it is possible to suppress ISI at the waveform level of each frequency channel within a range where the receiving side is capable of compensating ISI.

According to yet another aspect of the present invention, there is provided a transmitting device that transmits a signal over frequency channels set by dividing a frequency bandwidth assigned to a system, the transmitting device comprising: a spectrum usage information and policy information acquiring portion that has a function to detect a bandwidth of a frequency channel that is not being currently used and to determine usage status of that frequency channel; and a pulse shape and symbol rate controller that determines whether or not a user allows ISI and whether or not an adjacent frequency channel for another user is interfered, based upon the information acquired by the spectrum usage information and policy information acquiring portion, and that determines at least one of a center carrier frequency, a symbol rate, and a pulse shape, based upon a determination result, wherein the signal generated based upon a condition determined by the pulse condition determination means is transmitted. According to an aspect of the present invention, the transmitting device is capable of detecting a bandwidth of a frequency channel that is not being currently used and a usage status of a frequency channel, determining whether or not a user allows ISI and whether or not an adjacent frequency channel for another user is influenced, based upon the information acquired by the spectrum usage information and policy information acquiring portion, and determining at least one of a center carrier frequency, a symbol rate, and a pulse shape, based upon a determination result. It is therefore possible to transmit the signal with a high usage efficiency of the spectrum according to the usage status of the spectrum, while the signal quality of the received signal is being considered, after the pulse shaping filter decreases the interval between the frequency channels and occupied bandwidth according to the usage status of the frequency.

According to yet another aspect of the present invention, there is provided a receiving device that receives a signal transmitted over frequency channels set by dividing a frequency bandwidth assigned to a system, the receiving device receiving the signal transmitted by allowing Inter-Symbol Interference at a waveform level for each of the frequency channels, the transmitting device comprising ICI removal means that removes the Inter-Channel Interference, owing to overlapping adjacent frequency channels with each other, allowed at the signal transmitted. According to an aspect of the present invention, it is possible to remove the interference between channels of the received signal, thereby preventing the degradation of the quality of the received signal.

According to yet another aspect of the present invention, there is provided a receiving device that receives a signal over frequency channels set by dividing a frequency bandwidth assigned to a system, the receiving device comprising ISI compensation means that receives a signal transmitted by allowing Inter-Symbol Interference at a waveform level for a frequency channel, and then compensates the Inter-Symbol Interference at the waveform level for the frequency channels of the signal transmitted. According to an aspect of the present invention, it is possible to compensate the waveform of the received signal, thereby preventing the degradation of the quality of the received signal.

According to yet another aspect of the present invention, there is provided a method for communicating over frequency channels set by dividing a frequency bandwidth assigned to a system, the method comprising: receiving a signal transmitted by allowing Inter-Channel Interference to overlap the frequency channels adjacent to each other in a frequency domain; and removing ICI, owing to overlapping adjacent frequency channels with each other, from the signal received. According to an aspect of the present invention, the transmitting side transmits the signal by overlapping multiple frequency channels with each other, thereby making the frequency bandwidth assigned to the system available to more frequency channels and improving the usage efficiency of the spectrum. Also, the receiving side is capable of removing the interference between frequency channels generated on the overlapping frequency regions, thereby preventing the degradation in the signal quality of received signal.

According to yet another aspect of the present invention, there is provided a method for communicating over frequency channels set by dividing a frequency bandwidth assigned to a system, the method comprising: receiving a signal transmitted by allowing Inter-Symbol Interference at a waveform level for each of the frequency channels; and compensating the Inter-Symbol Interference at the waveform level for each of the frequency channels of the signal out of the signals received in the receiving. According to an aspect of the present invention, the transmitting device is capable of transmitting the signal with a pulse that does not satisfy the zero ISI condition, thereby decreasing the bandwidth of each frequency channel. Consequently, the frequency bandwidth assigned to the system can be used by more frequency channels, thereby improving the usage efficiency of the spectrum. In addition, in shaping the pulse, the zero ISI condition does not have to be considered, thereby improving the design flexibility of the filter for pulse shaping. Further, since the receiving side is capable of compensating ISI, the degradation in the signal quality of the received signal can be prevented.

According to yet another aspect of the present invention, there is provided a method for communicating over frequency channels set by dividing a frequency bandwidth assigned to a system, the method comprising: acquiring information about a function to detect a bandwidth of a frequency channel that is not being currently used and to determine usage status of that frequency channel; determining whether or not a user allows ISI and whether or not an adjacent frequency channel for another user is interfered, based upon the information acquired in the acquiring; and controlling determination of at least one of a center carrier frequency, a symbol rate, and a pulse shape of a signal transmitted from the transmitting device, based upon a determination result in the determining. According to an aspect of the present invention, the transmitting device is capable of detecting the bandwidth of the frequency channel that is not being currently used, determining whether or not a user allows ISI and whether or not an adjacent frequency channel for another user is influenced, also determining whether or not it is possible to allow the frequency channel, for another user, adjacent to the frequency channel to interfere with the frequency channel, and determining at least one of the center carrier frequency, symbol rate, the shaped pulse of the signal to be transmitted, based on the above determination. Accordingly, it is possible to transmit the signal with a pulse shape of a high usage efficiency of the frequency according to the usage status of the frequency, while the signal quality of the received signal is being taken into consideration.

ADVANTAGEOUS EFFECT OF THE INVENTION

According to an aspect of the present invention, it is possible to transmit the signals where frequency channels bandwidths are narrower, compensate the signal waveform of the frequency channels at the receiving side or remove the interference between frequency channels. It is also possible to make the signal transmitted by the transmitting device interfere with another frequency channel according to the status and/or allow the inter-symbol interference at a waveform level for frequency channels. This enables to provide a communication system, transmitting device, receiving device, and communication method, whereby the spectrum usage efficiency is high and the signal quality is not degraded, without the need for users' cooperation.

BRIEF DESCRIPTION OF THE DRAWINGS

FIG. 11A to FIG. 11C are illustrations of the allowable range where the bandwidth of the frequency channel is narrowed by allowing ISI according to the second embodiment of the present invention;

FIG. 15A to FIG. 15C are flowcharts illustrative of communication methods performed according to the first to third embodiments of the present invention;

FIG. 16 is an illustration of comparisons of obtainable effects among the first to third embodiments of the present invention;

FIG. 19 is a flowchart illustrative of the communication method according to the fourth embodiment of the present invention;

Figure 1A:
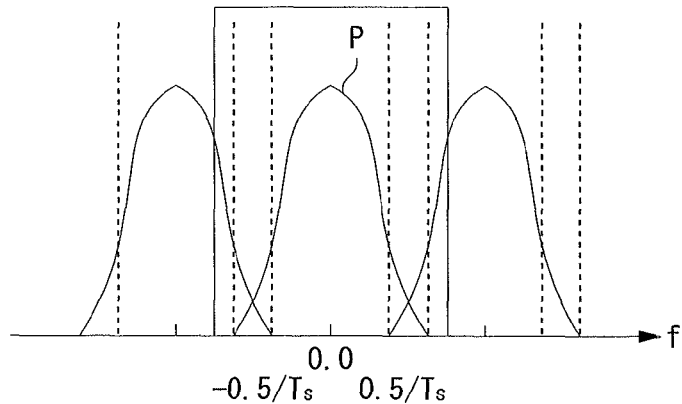
FIG. 1A to FIG. 1C are illustrations of the technical theory of removing ICI according to a first embodiment of the present invention.

EXPLANATION OF REFERENCES 101a, 101b base transceiver station
102a, 102b transmitting and receiving device
103a, 103b, 104a, 104b, 104c mobile telephone
111 ICI removal and ISI compensation filter
151, 161 transmitting unit
152 data generator and modulator
153 pulse shaping portion
154 D/A converter
155, 501 RF portion
157 spectrum usage information and policy information acquiring portion
158 pulse shape and symbol rate controller
159 center carrier frequency controller
401 transmitting and receiving portion
502 A/D converter
503, 504, 505 channel selection filter
506 ICI removal filter
801 ISI compensation filter

BEST MODE FOR CARRYING OUT THE INVENTION

Hereinafter, first to fourth embodiments will be described with reference to accompanied drawings. In the description of each of the embodiments, the drawing or description for the same configuration will be partially omitted. In addition, the same components and configurations as those employed before have the same reference numerals.

1 Technical Theory

Firstly, before embodiments of the present invention are described, a description will be given of the technical theory of signal processing for removing the interference, to be performed according to the first to fourth embodiments.

The first embodiment is applicable to the multiple access, in which data transmitted from communication terminal devices of the respective users at multiple points are multiplexed in an efficient. Hereinafter, the principle of the multiple access according to the present invention will be described first before the principles of a communication system, transmitting device, receiving device, and communication method are described.

(1) Removal of ICI

A method for removing ICI (Inter-Channel Interference) will firstly be described. The ICI is removed according to the first embodiment, because ICI that is the interference between channels occurs in a case where zero ISI is satisfied at the transmitting side and the frequencies are overlapped with each other to decrease the intervals between the frequency channels.

Figure 1B:
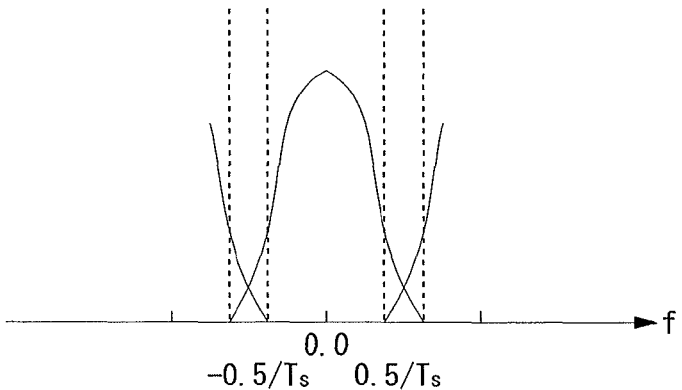
Figure 1C:
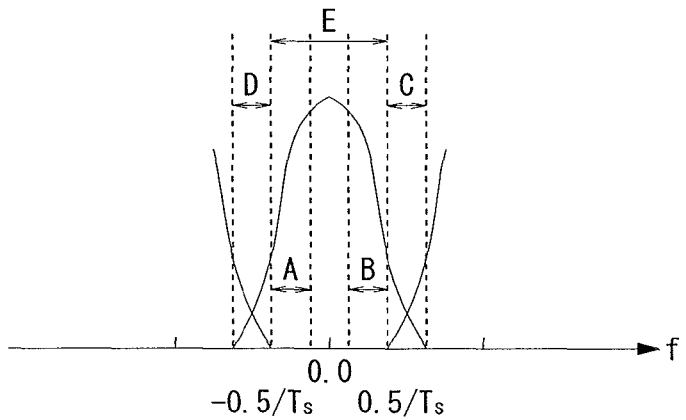

FIG. 1A, FIG. 1B, and FIG. 1C are illustrations of the technical theory of removing ICI according to the first embodiment of the present invention. The removal of ICI is achieved with the use of filters capable of exploiting cyclostationarity such as a Cyclic Wiener Filter or an FSE (Fractionally Spaced Equalizer) filter.

An adaptive filter for ICI removal utilizes the cyclostationarity of signals, so that the frequency component outside the Nyquist bandwidth (excessive bandwidth frequency component), which is interfered by overlapping adjacent frequency channels can be restored by use of the frequency components inside the Nyquist bandwidth (information bandwidth) that is not influenced by the interference.

Figure 2:
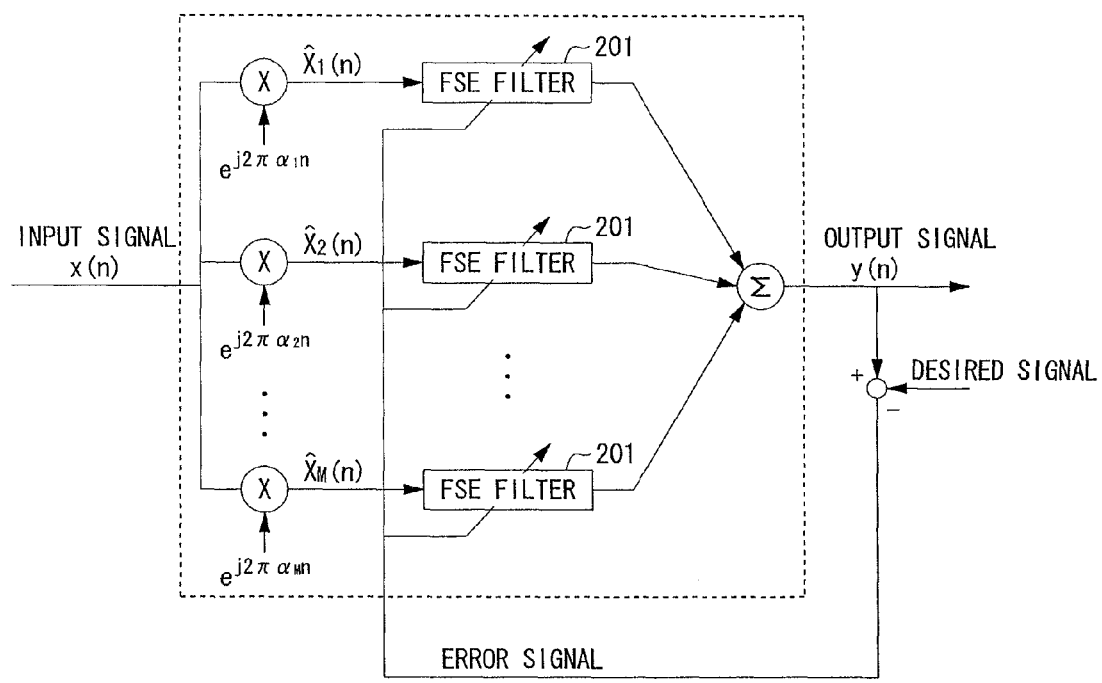
FIG. 2 is an illustration of a Cyclic Wiener filter.
Figure 3:
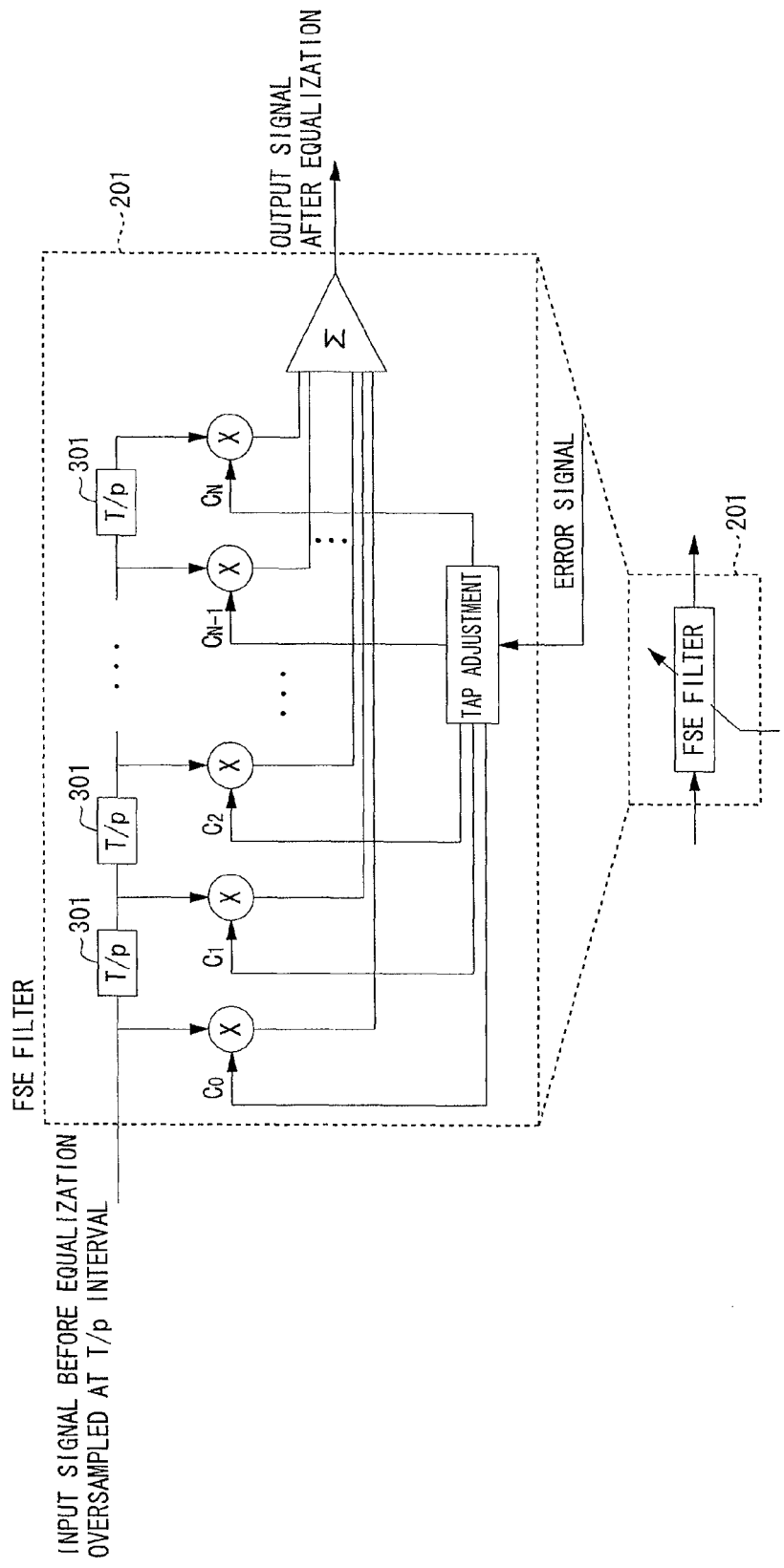
FIG. 3 is an illustration of an FSE filter.

FIG. 2 is an illustration of the outline of a Cyclic Wiener filter. FIG. 3 is an illustration of an FSE filter. Referring to FIG. 2, the Cyclic Wiener filter includes multiple FSE filters 201 connected in parallel with each other to combine the outputs from the FSE filters 201. The combined outputs are subtracted from a desired signal and an error signal is calculated. Each of the filter coefficients of the FSE filters 201 is adjusted to make the error signal small.

Referring now to FIG. 3, the FSE filter 201 includes a series of delay elements 301 that delay the oversampled signal to be input, so a coefficient or a weight ci is multiplied with the respective outputs and are combined. Such a group of coefficients are referred to as tap coefficient. Incidentally, since the Cyclic Wiener filter and the FSE filter 201 are known as described in Document 1 and Document 2 to be listed below, the detailed description thereof will be omitted.

Document 1: W. A. Gardner, "Exploitation of spectral redundancy" in cyclostationary signals", IEEE Signal Processing Magazine, vol.8, no.2, pp. 14-36, April 1991

Document 2: W. A. Gardner, "Cyclic Wiener filtering: theory and method", IEEE Trans. Commun, vol. 41, no. 1, pp. 151-163, January 1993

In the example illustrated in FIG. 1A, the frequency channel indicated by P in the middle of the three frequency channels is to be processed. In this situation, there are overlapping regions between the frequency channel P and its adjacent frequency channels, respectively. Hence, the frequency channel P is incurred by the influence of the interference from the adjacent frequency channels. According to the cyclostationarity of signals, as illustrated in FIG. 1C, there is a high correlation between the frequency component of a range D and the frequency component of a range B, and there is a high correlation between the frequency component of a range C and the frequency component of a range A. This enables the signal component of the range D to be restored by use of the signal component of the range B, and also enables the signal component of the range C to be restored by use of the signal component of the range A, according to the present embodiment. A frequency range E of FIG. 1C represents the Nyquist bandwidth.

Figure 4A:
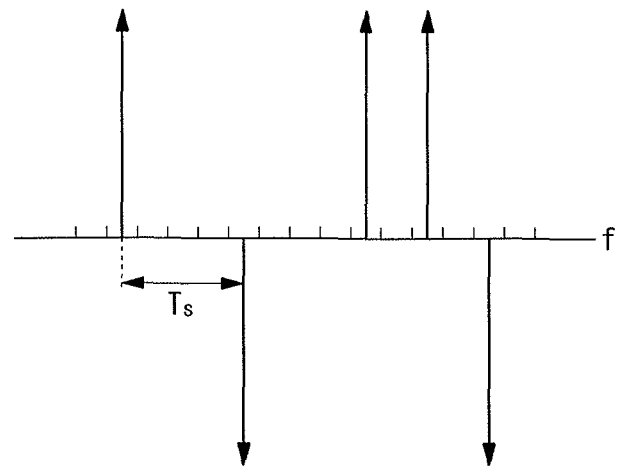
FIG. 4A to FIG. 4C are illustrations of cyclostationarity according to the first embodiment of the present invention.
Figure 4B:
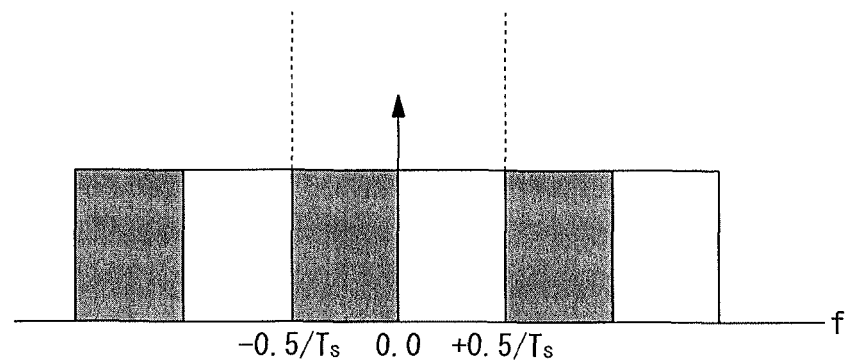
Figure 4C:
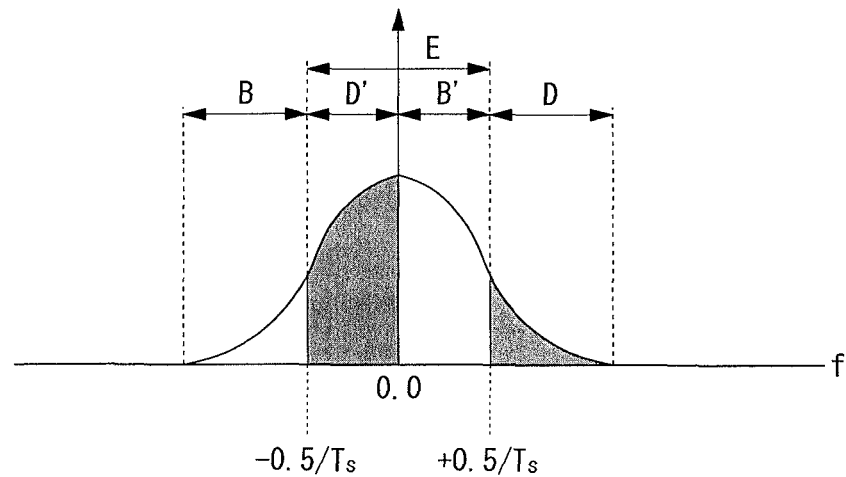

Hereinafter, the cyclostationarity will be briefly described. FIG. 4A illustrates a state where digitally converted signals are periodically transmitted at a symbol interval Ts. FIG. 4B illustrates spectrums of the signals illustrated in FIG. 4A. By shaping the spectrums of FIG. 4B into pulses, the pulse signals of FIG. 4C are obtained. According to the cyclostationarity of the spectrums illustrated in FIG. 4B, in the pulse signals of FIG. 4C, there is a correlation between the frequency components in the Nyquist bandwidth (B', D') and the excessive bandwidth frequency component (B, D). The excessive bandwidth refers to the bandwidth which the remaining signal bandwidth after excluding the Nyquist bandwidth from the occupied bandwidth.

In the first embodiment, ICI is allowed by overlapping the frequency channels by use of the correlation of the frequency components at each frequency channel, to remove the interference between channels (ICI) at the receiving side. The interference removal between the frequency channels is performed for each frequency channel by an ICI removal filter.

(2) Zero ISI

Figure 5A:
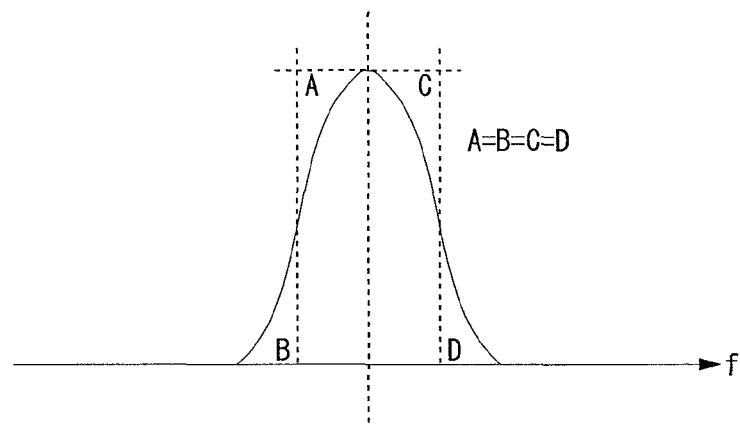
FIG. 5A to FIG. 5C are illustrations of a method of generating a zero ISI signal according to a second embodiment of the present invention.
Figure 5B:
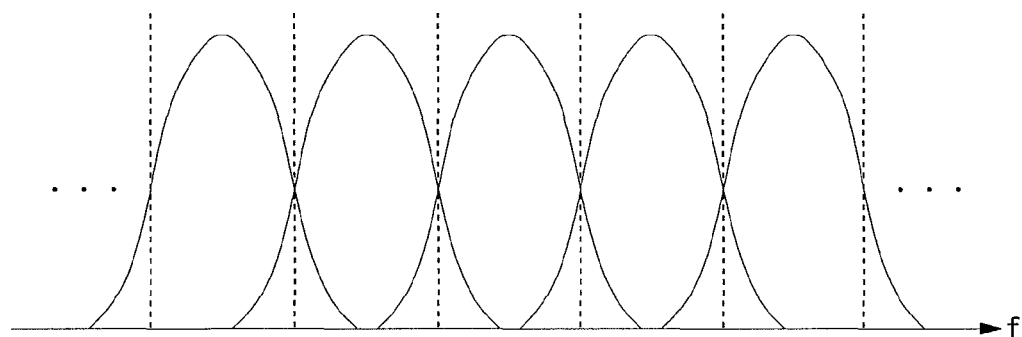

FIG. 5A and FIG. 5B are illustrations of a method for removing ISI (Inter-Symbol Interference) to generate signals of zero ISI according to a second embodiment. FIG. 5A is an illustration of an example of the frequency response of a raised cosine pulse that satisfies the conditions for zero ISI.

In FIG. 5A, the horizontal axis represents frequency f, and the vertical axis represents pulse Frequency Response. Vestigial symmetry is satisfied for the boundary line (+0.5/Ts, −0.5/Ts) of the Nyquist bandwidth [−0.5/Ts, 0.5/Ts] (where the symbol rate is 1/Ts). The condition for satisfying the Vestigial symmetry is that all regions A, B, C, and D in FIG. 5A are equal to each other (A=B=C=D). In the second embodiment, the condition for satisfying A=B=C=D is a zero ISI condition.

Additionally, the Nyquist frequency is a half the symbol rate (where the symbol rate is 1/Ts, the Nyquist frequency is 0.5/Ts). The Nyquist bandwidth ranges from −0.5/Ts to 0.5/Ts, with 0 Hz being in the middle.

Figure 5C:
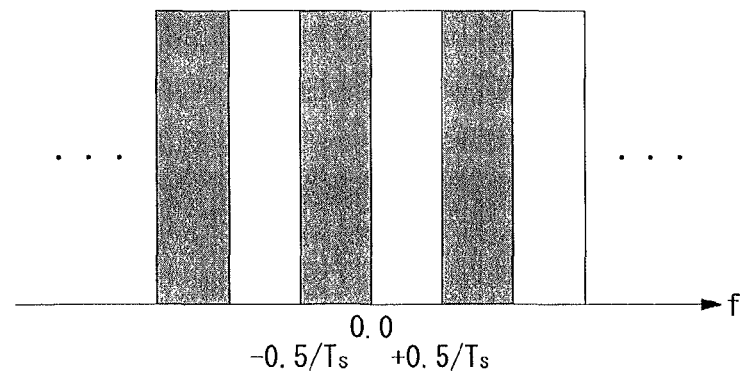

FIG. 5B illustrates an example in which a pulse satisfying the condition A=B=C=D of FIG. 5A is sampled. The pulse's frequency response is folded after sampling due to aliasing, and such folded signals are added to finally obtain the flat spectrum of FIG. 5C. That is to say, the pulse's frequency response that enables zero ISI at the waveform level turns to be flat after sampling.

In the second embodiment, the above characteristic is employed. In other words, induction of artificial ISI (Inter-Symbol Interference) is allowed at a waveform level at the transmitting side before multiplexing of multiple transmission signals. On the other hand, the ISI is compensated at the waveform level of a signal at the receiving side to remove Inter-Symbol Interference (ISI).

(First Embodiment)

(Communication System)

Figure 6:
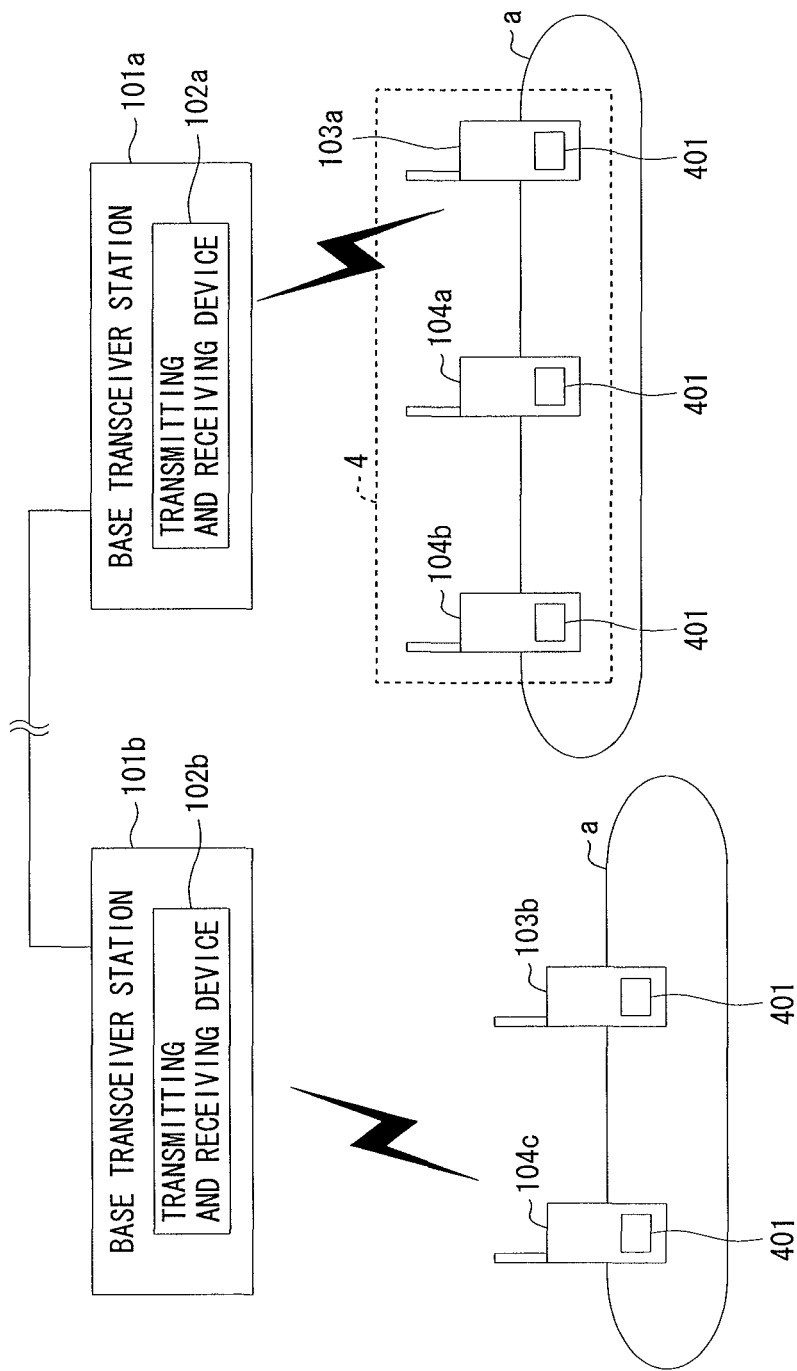
FIG. 6 is an illustration of a communication system according to the first embodiment and according to a fourth embodiment of the present invention.

The outline of a communication system according to a first embodiment will now be described. FIG. 6 is a view illustrative of a communication system according to the first embodiment and according to a fourth embodiment. The communication system according to the first embodiment is a communication system that utilizes the frequency channels set by dividing the frequency into multiple bandwidths.

As illustrated, the communication system according to the present embodiment includes base transceiver stations 101*a* and 101*b*, and mobile telephones 103*a*, 103*b*, 104*a*, 104*b*, and 104*c* that communicate with another communication terminal device via the base transceiver stations 101*a* and 101*b*. Both the communication areas which can be managed by the base transceiver stations 101*a* and 101*b* are referred to as communication management area a.

The mobile telephones 103*a* and 103*b* are served by the same telecommunications carrier, whereas the mobile telephones 104*a*, 104*b*, and 104*c* are served by a telecommunications carrier different from that which serves the mobile telephones 103*a* and 103*b*. In addition, in FIG. 6, all the communication terminal devices that communicate in the communication system are represented as mobile telephones. However, the first embodiment is not limited to such a configuration. This is applicable to any communication terminal device that can communicate with the communication system.

The base transceiver stations 101*a* and 101*b* are provided with transmitting and receiving devices 102*a* and 102*b*, respectively. The transmitting and receiving device 102*a* receives signals that the mobile telephones 103*a*, 104*a*, and 104*b* respectively transmit over the frequency channels, and then multiplexes the received signals. Such multiplexed signals are transmitted to the base transceiver station 101*b* via a device for an upper layer.

The transmitted signals are received by the transmitting and receiving device 102*b*, and are then transmitted to the mobile telephone 103*b* or 104*b* to be received.

The mobile telephones 103*a* and 103*b* as well as the mobile telephones 104*a*, 104*b*, and 104*c* are also provided with transmitting and receiving portions 401, respectively.

In the first embodiment, all of multiple transmitting and receiving portions 401 of multiple mobile telephones each serve as a transmitting device, whereas the transmitting and receiving devices 102*a* and 102*b* each serve as a receiving device. However, the present invention is not limited to the above configuration. The transmitting and receiving devices may have any configuration as far as the transmitting devices in multiple access transmit radio signals and the receiving devices receive the radio signals that have been transmitted.

(Transmitting Device)

The transmitting device according to the first embodiment of the present invention will be described. As described above, the users of the mobile telephones 103*a*, the 104*a*, and the 104*b* are different from each other. For this reason, the mobile telephone 103a communicates with the base transceiver station 101a, over a single or multiple frequency channels different from that or those of the mobile telephones 104a and 104b.

As an example, a description will be given of a case where the frequency channel of the mobile telephone 103a and the frequency channels of the mobile telephones 104a and 104b are adjacent on the frequency. Additionally, in the first embodiment, each of the frequency channels is supposed to satisfy the zero ISI so as not to generate ISI.

Figure 7:
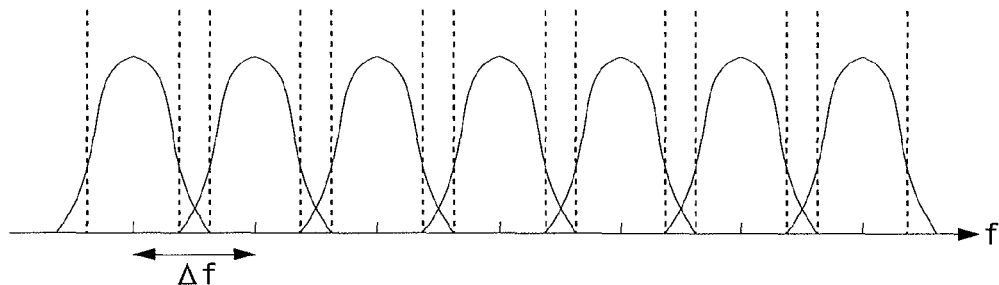
FIG. 7 is an illustration of a state where frequency channels to be used by multiple users overlap each other according to the first embodiment of the present invention.

FIG. 7 illustrates the frequency channels to be used for transmission of the signals of the mobile telephones 103a, 104a, and 104b according to the first embodiment. The frequency channels illustrated in FIG. 7 overlap each other while the pulse shaping of each frequency channel satisfies the condition for the zero ISI. Incidentally, as to the pulse shaping filter of the frequency channels, the pulses are shaped at each of the transmitting and receiving portion 401 at the transmitting side so that the pulses satisfy the zero ISI condition.

That is to say, the transmitting device according to the first embodiment is provided for transmitting the signals with the adjacent multiple frequency channels overlapping each other in the frequency domain.

In addition, in the frequency channels of the transmission signals, the intervals between the frequency channels are made narrower by overlapping. To accommodate the ICI within an allowable range at the receiving side, the overlapping range might be limited to a part of the excessive bandwidth.

Further, the transmitting device according to the first embodiment is not limited to a group of multiple communication terminal devices, but may employ a single configuration for transmitting the signals while the multiple frequency channels are being overlapped.

(Receiving Device)

Figure 8:
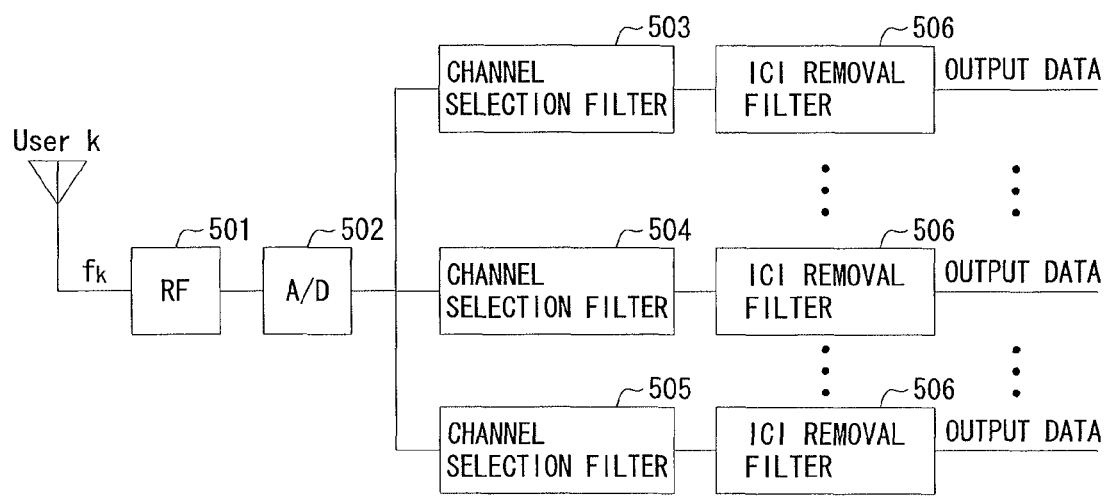
FIG. 8 is an illustration of a receiving device according to the first embodiment of the present invention.

FIG. 8 illustrates the receiving deice according to the first embodiment. The receiving device is provided with ICI removal filters 506 that remove the interference between frequency channels generated in the overlapped region, out of the transmitted signals. In such a configuration, the ICI removal filter 506 corresponds to ICI removal means.

The receiving device is also provided with multiple channel selection filters 503, 504, and 505. Such filters are provided for selecting the frequency channel for the transmitted signal, when a user uses multiple frequency channels.

That is to say, the receiving device illustrated in FIG. 8 receives, for example, signals transmitted by a user k. The received signal is down-converted by an RF portion 501, and is then converted into digital signals by an A/D converter 502. If the user k utilizes M frequency channels, the receiving device extracts multiple frequency channels that the user k used for communication with the use of M channel selection filters. In the example illustrated in FIG. 8, the signal that the user k transmitted passes through the channel selection filter 504.

In addition, in the first embodiment, the pulse waveforms of the frequency channels after reception of the signals satisfy the zero ISI condition. The pulse shaping for satisfying the zero ISI condition may be performed at the transmitting device beforehand as described in the first embodiment, or a filter for shaping the pulse waveforms in cooperation with the pulse waveform shaping filter, not illustrated, of the transmitting device may be provided at the receiving device.

Figure 9:
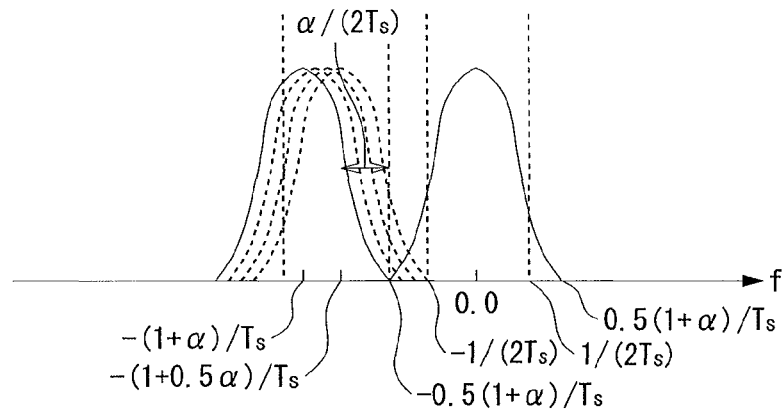
FIG. 9 is an illustration of the allowable range of ICI according to the first embodiment of the present invention.

Furthermore, the frequency bandwidth in which the respective frequency channels are overlapped is limited within the excessive bandwidth range, thereby allowing the ICI removal filter 506 to remove ICI within the excessive bandwidth range. FIG. 9 illustrates an allowable range of ICI. In a case where a symbol rate is $1/T_s$ and a roll-off coefficient for pulse shaping is $\alpha$, the ICI allowable range is represented by $\alpha/2T_s$, as illustrated in FIG. 9.

Incidentally, the ICI allowable range is influenced by the strength of the signal transmitted over the frequency channel. If a frequency channel of a signal has a power too weak to influence the frequency channel, it may interfere with the Nyquist bandwidth of the adjacent frequency channel.

Also, a cyclic Wiener filter that utilizes the cyclostationarity or an FSE filter may be used for the ICI removal filter 506.

According to the first embodiment described heretofore, the transmitting side is capable of transmitting the overlapped signal while satisfying the ISI zero condition, whereas the receiving side is capable of removing interference between frequency channels by removing the ICI generated by overlapping. It is therefore possible to provide a communication system, transmitting device, receiving device, and communication method, whereby the usage efficiency of the frequencies is high and the signal quality is not degraded, without the need for cooperation among multiplexed users.

(Second Embodiment)

A second embodiment of the present invention will now be described. In the second embodiment, a description will be given of the receiving device that receives the signal of the frequency channel that does not satisfy the zero ISI condition, and that performs the ISI compensation at the receiving device side. In the second embodiment, the transmitting side does not make the pulse signals overlapped.

In the second embodiment, the transmitting and receiving portions 401 of the mobile telephones 103a, 104a, and 104b serve as signal transmitting means that allows the ISI in multiple frequency channels and then transmits the signals.

Figure 10:
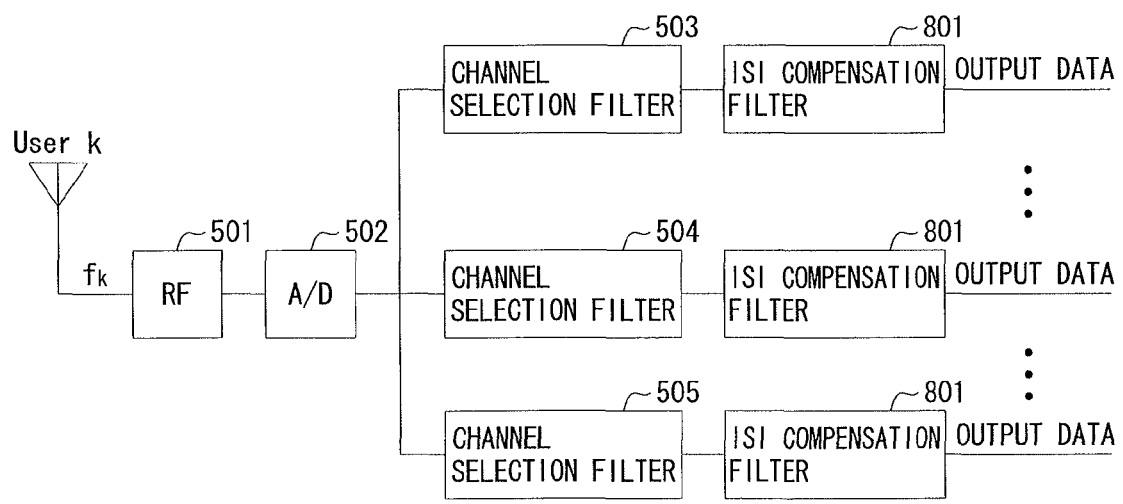
FIG. 10 is a block diagram illustrative of the configuration of the receiving device according to the second embodiment of the present invention.

FIG. 10 is a block diagram illustrative of the configuration of the receiving device according to the second embodiment. The receiving device illustrated in FIG. 10 is provided with the RF portion 501 and the A/D converter 502 as with the receiving device illustrated in FIG. 8. However, the receiving device illustrated in FIG. 10 is different from that of FIG. 8 in that ISI compensation filters 801 are provided instead of the ICI removal filters 506. The ISI compensation filter 801 serves as ISI compensation means according to the present embodiment.

The ISI compensation filter is achieved with an adaptive filter that utilizes the cyclostationarity. As an adaptive filter, for example, the Cyclic Wiener filter, FSE filter or the like may be employed.

FIG. 11A is an illustration of signals received by the receiving device according to the second embodiment. In the illustrated frequency channels, the pulse shaping of each channel does not satisfy the zero ISI condition. Such signals have poor signal quality subsequent to the reception, due to the influence of ISI, so may not transmit the information with accuracy. In the second embodiment, even in a case where such signals are received, the communication with high signal quality and high usage efficiency of frequencies are achieved by compensating the ISI at the receiving side.

FIG. 11B and FIG. 11C are illustrations of an allowable range in which the bandwidth of the frequency channels is narrowed by the allowing non-zero ISI. FIG. 11B illustrates the shapes of the frequency channels in a case where the zero ISI condition is satisfied without employing the method in the second embodiment. In this case, the bandwidth of the frequency channels is represented by $(1+\alpha)/T_s$, where a symbol rate is $1/T_s$ and a roll-off coefficient for satisfying the zero ISI condition is $\alpha$. FIG. 11C illustrates a case where the bandwidth of the frequency channels is made narrower by use of the method according to the second embodiment. In this case, the bandwidth of the frequency channels is made narrower to the Nyquist bandwidth (=1/Ts). This permits the bandwidth of the frequency channels to be narrower by α/Ts.

Figure 12A:
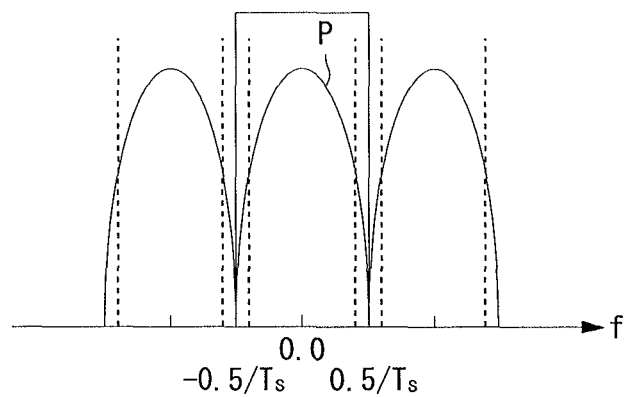
FIG. 12A to FIG. 12C are illustrations of a procedure of the ISI compensation according to the second embodiment of the present invention.
Figure 12B:
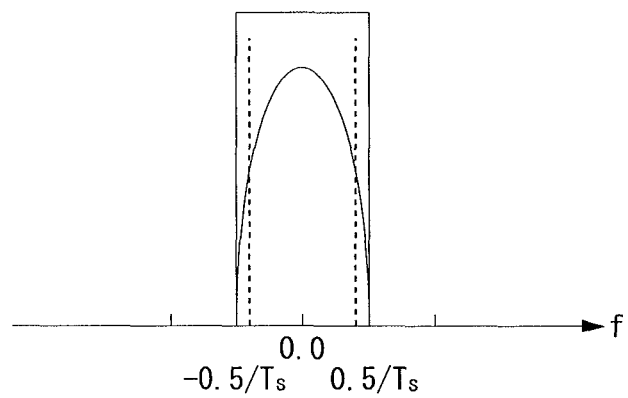
Figure 12C:
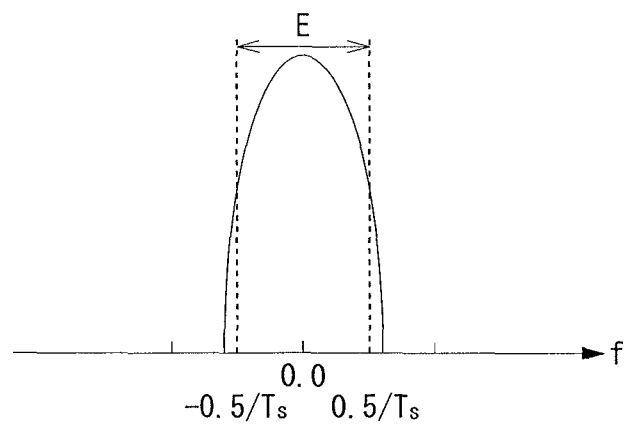

FIG. 12 is an illustration of a procedure of the ISI compensation according to the second embodiment. The ISI compensation according to the second embodiment is supposed to process the frequency channel indicated by P in the middle out of three frequency channels illustrated in FIG. 12A. The frequency channel P to be processed is extracted by the channel selection filter (FIG. 12B), and then the ISI component of the extracted frequency channel P is compensated by the ISI compensation filter 801. Consequently, the signals adjusted to satisfy the zero ISI condition are output from the ISI compensation filter 801 (FIG. 12C).

Additionally, as a preferable pulse for shaping that does not satisfy the zero ISI condition in the second embodiment, there is a pulse that satisfies the following two expressions.

$$X(f) = \cos(\pi f Ts/(1+\alpha)) \text{ for } |f| < (1+\alpha)/2Ts$$

and $$X(f) = 0 \text{ for otherwise}$$

Such a pulse has relatively small excess bandwidth (α/Ts) and the shape of its frequency response is smooth.

According to the second embodiment as described above, it is made possible for the transmitting device to transmit the signals with the pulse that does not satisfy the zero ISI condition, thereby making small the bandwidth of each of the frequency channels. This allows the frequency bandwidth assigned to the system to be used by more frequency channels, thereby increasing the usage efficiency of the spectrum. Moreover, in shaping the pulse, the zero ISI condition does not have to be considered, thereby increasing the design flexibility of the filter used for pulse shaping.

(Third Embodiment)

A third embodiment of the present invention will now be described. In the third embodiment, a description will be given of a receiving device, which includes the characteristics of the first embodiment and the second embodiment, and which is provided with both the ICI removal filter and the ISI compensation filter at the receiving device side.

Figure 13:
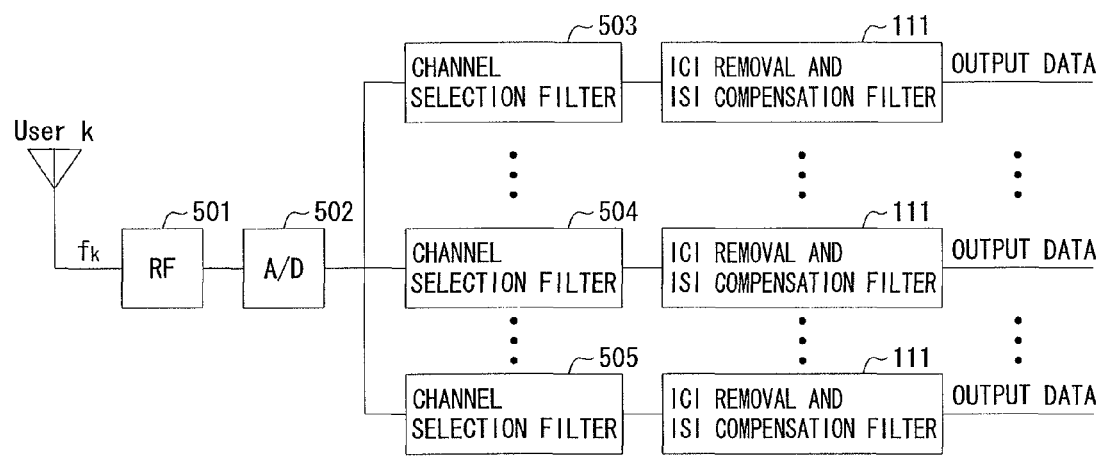
FIG. 13 is a block diagram illustrative of a configuration of the receiving device according to the third embodiment of the present invention.

FIG. 13 is a block diagram illustrative of a configuration of the receiving device according to the third embodiment. The receiving device illustrated in FIG. 13 is provided with the RF portion 501 and the A/D converter 502 as with the receiving device illustrated in FIG. 8 and FIG. 10, and is further provided with an ICI removal and ISI compensation filter 111. The ICI removal and ISI compensation filter 111 is a filter in which the functions of the ICI removal filter 506 and the ISI compensation filter 801, described above, are combined and which is achievable by an adaptive filter. As an adaptive filter, for example, a Cyclic Wiener filter or FSE filter may be used.

Figure 14:
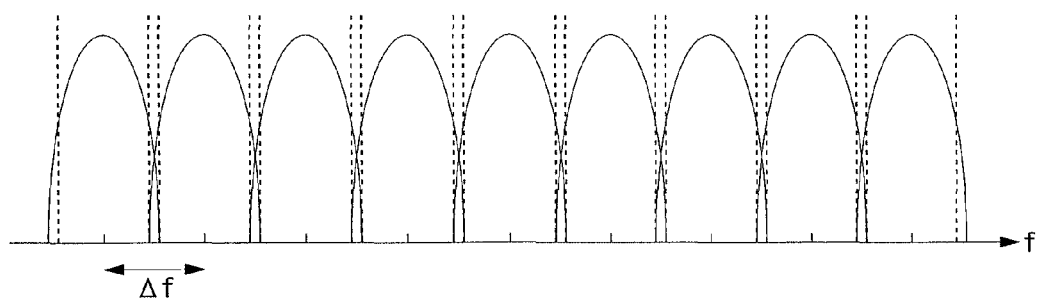
FIG. 14 is an illustration of examples of arrangement and shaping of frequency channels according to the third embodiment of the present invention.

FIG. 14 is an illustration of frequency channels preferable to shape the pulse waveforms at the receiving device according to the third embodiment. In FIG. 14, the horizontal axis represents frequency and the vertical axis represents frequency response of the pulse. The frequency channels having such waveforms overlap each other without satisfying the zero ISI condition.

The signal received by the receiving device illustrated in FIG. 13 is down-converted by the RF portion 501, is then converted into digital by the A/D converter 502, and further passes through any one of corresponding channel selection filters. Subsequently, the ICI removal and ISI compensation filter 111 removes ICI and compensates for ISI.

According to the third embodiment as described, the transmitting side transmits the signals overlapping each other with the pulses that do not satisfy the zero ISI condition, and the receiving side performs ISI compensation. Simultaneously, it is possible to remove ICI generated by overlapping frequency channels and compensate for ISI owing to the use of non-zero ISI shaping filters to shape frequency channels. This allows the bandwidth of each frequency channel to be narrower. Also, the frequency channels are overlapped for transmission, thereby allowing the frequency bandwidth assigned to the system to be used by more frequency channels. It is therefore possible to improve the usage efficiency of the spectrum. Moreover, in shaping the pulse, the zero ISI condition does not have to be considered, thereby increasing the design flexibility of the filter that performs the pulse shaping.

It is therefore possible to provide a communication system, transmitting device, receiving device, and communication method, whereby the usage efficiency of the frequency is high and the signal quality is not degraded, even if the multiplexed users do not cooperate with each other.

(Communication Method)

FIG. 15A, FIG. 15B, and FIG. 15C are flowcharts illustrative of communication methods performed in the first to third embodiments as described heretofore. The flowcharts illustrated in FIG. 15A, FIG. 15B, and FIG. 15C include the same processes. In the drawings, the same processes are indicated by the same numerals.

Referring to FIG. 15A, in the first embodiment, the receiving device receives a signal from the transmitting device (S131). Then, the receiving device uses multiple channel selection filters to extract the frequency channel of the signal to be received (S132). Then, the receiving device uses an ICI removal filter suitable for the frequency channel extracted by the channel selection filter, and removes ICI from the received signal (S133).

In addition, in the second embodiment, the receiving device receives a signal from the transmitting device (S131). Then, the receiving device uses multiple channel selection filters to extract the frequency channel of the signal to be received (S132). The receiving device uses an ISI compensation filter suitable for the frequency channel extracted by the channel selection filter, and compensates ISI of the received signal (S134).

Furthermore, in the third embodiment, the receiving device receives a signal from the transmitting device (S131). Then, the receiving device uses multiple channel selection filters to extract the frequency channel of the signal to be received (S132). The receiving device uses an ICI removal and ISI compensation filter suitable for the frequency channel extracted by the channel selection filter, and removes ICI of the received signal and compensates ISI thereof (S135).

(Comparisons of the First to Third Embodiments)

Figure 20:
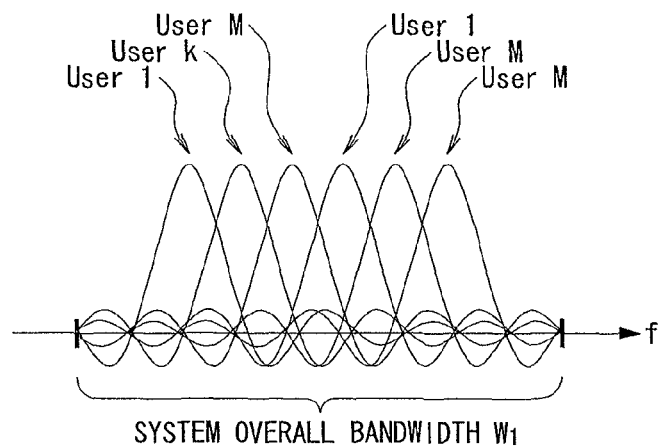
FIG. 20 shows frequency spectrums of a general OFDMA.
Figure 21:
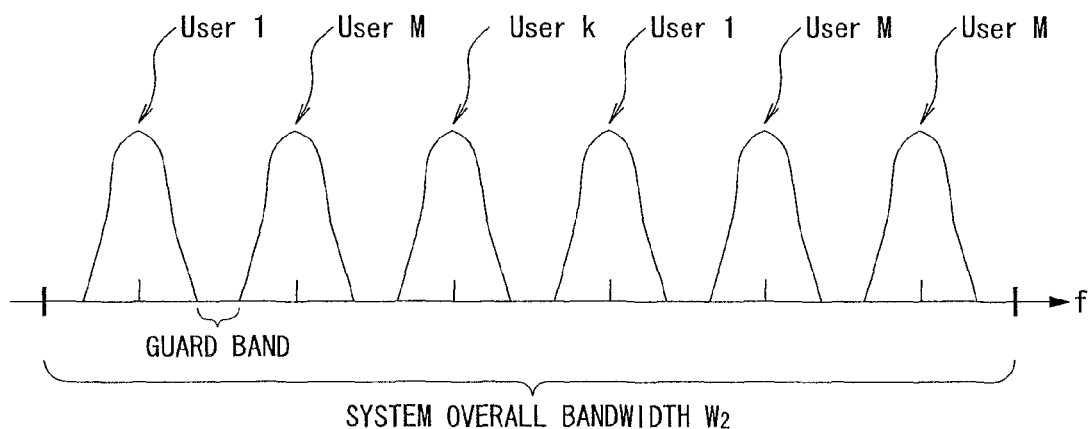
FIG. 21 shows frequency spectrums of a general FDMA.
Figure 22:
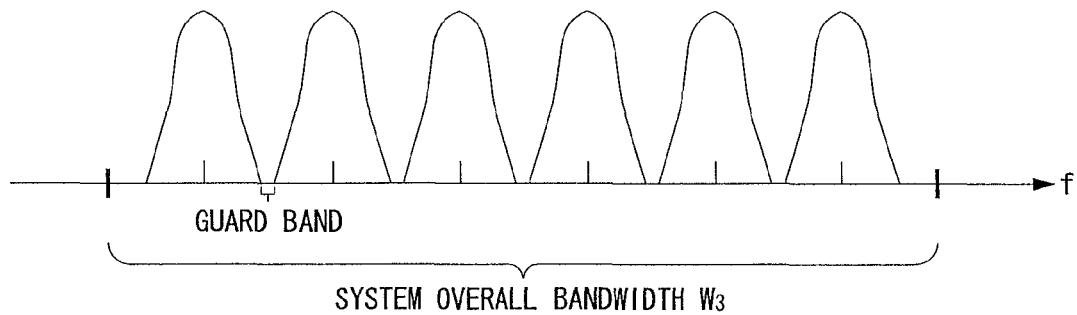
FIG. 22 shows a case where intervals between the frequencies channel are made narrower by making guard bands smaller.
Figure 23:
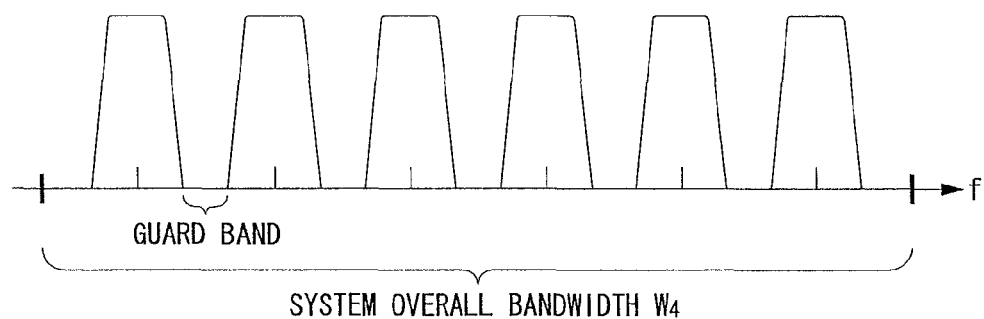
FIG. 23 shows another case where the pulse waveform frequency response is made steep to make the intervals between the frequency channels narrower.

FIG. 16 is an illustration of comparisons of obtainable effects in the first to third embodiments. In the drawing, the communication of FDMA shown in FIG. 21 is represented by conventional method 1 and the communication of OFDMA shown in FIG. 20 is represented by conventional method 2. Also, the communication method according to the first embodiment is represented by proposed method 1, the communication method according to the second embodiment is represented by proposed method 2, and the communication method according to the third embodiment is represented by proposed method 3.

Also in FIG. 16, with respect to the above five methods, four items including spectrum usage efficiency, magnitude of temporal dispersion in the time response of the pulse, presence or absence of Inter-Channel Interference (ICI), presence or absence of Inter-Symbol Interference (ISI) are compared. As illustrated, the communication method or the communication system and the receiving device according to the first to third embodiments are capable of improving the efficiency of the spectrum usage, as compared to the conventional technique, and are capable of decreasing the magnitude of temporal dispersion in the time response of the shaping filter used to shape each frequency channel. Additionally, ICI, ISI, or both of them are permitted and transmitted, so that the receiving side can remove and compensate them to extract the signals of each frequency channel in good quality.

Fourth Embodiment

A fourth embodiment will now be described. A communication system according to the fourth embodiment is a communication system that communicates over frequency channels, and is provided with a transmitting device that transmits signals and a receiving device that receives the signals transmitted by the transmitting device. According to the fourth embodiment, the transmitting and receiving device 102b illustrated in FIG. 6 is supposed to be a transmitting device and the mobile telephones 103b and 104c in the management area a are supposed to be receiving devices.

Figure 17A:
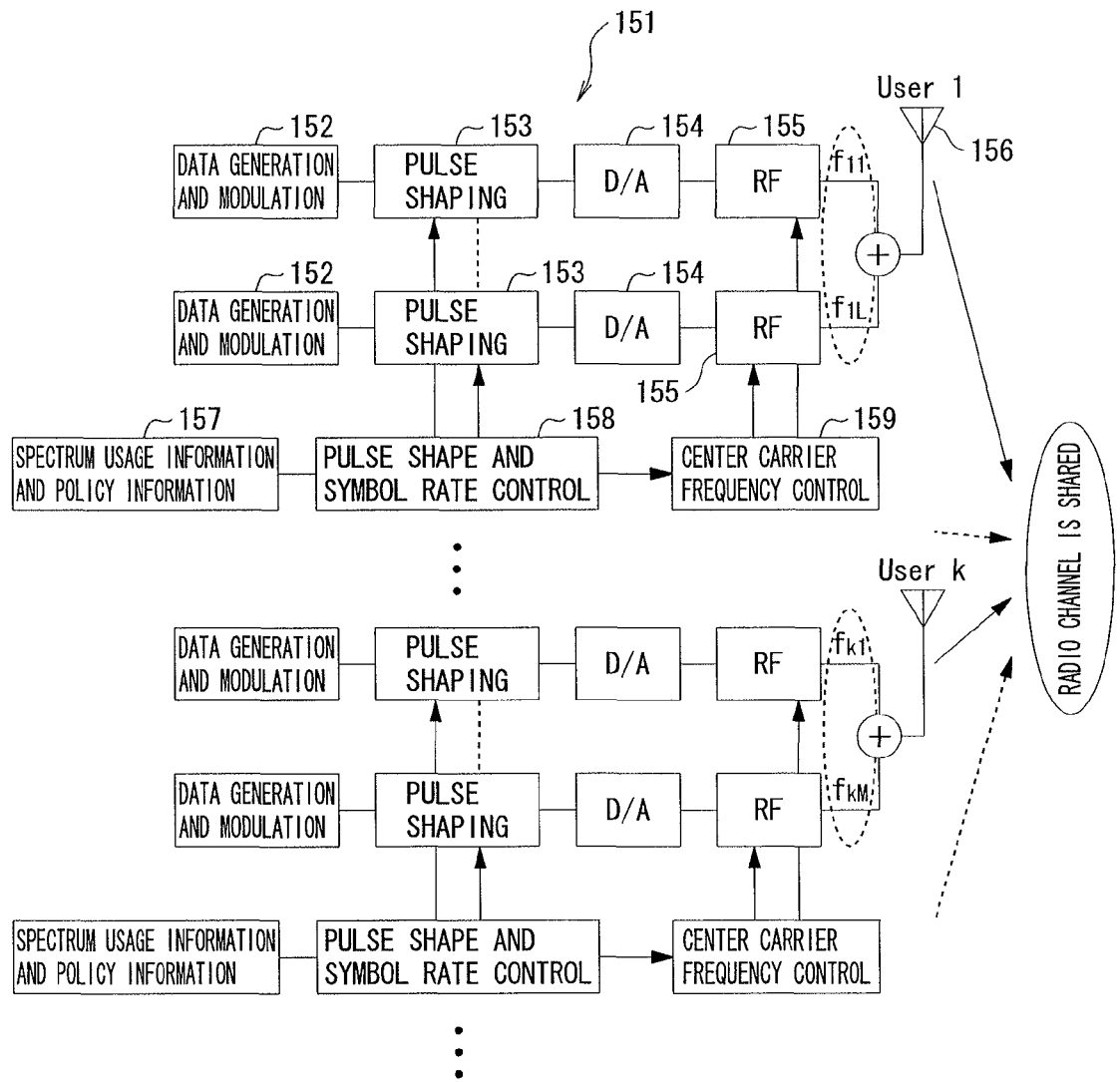
FIG. 17A and FIG. 17B are block diagrams illustrative of a configuration of the transmitting device according to a fourth embodiment of the present invention.
Figure 17B:
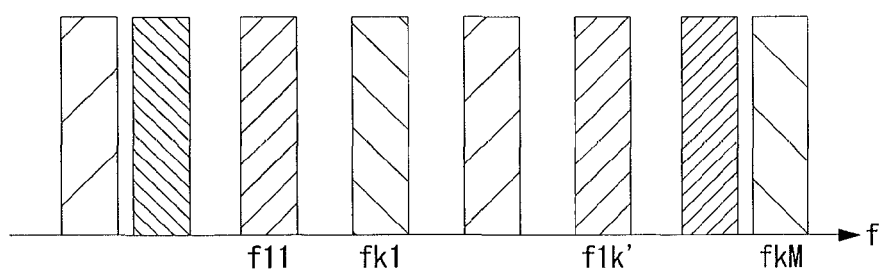

FIG. 17A and FIG. 17B are block diagrams illustrative of a configuration of the transmitting device according to the fourth embodiment. FIG. 17A is a view illustrative of a configuration of the transmitting device and FIG. 17B is a view illustrative of multiple users using multiple frequency channels.

Referring to FIG. 17B, in multiple access, multiple users (user 1, . . . , and user N) use multiple channels (for example, the user k uses frequency channels $f_{k1}$, $f_{k2}$, . . . , and $f_{kM}$) to transmit multiple data streams in parallel. In FIG. 17B, the horizontal axis represents frequency.

In the drawing, identical hatching patterns denote the frequency channels used by the same user. In this situation, the user 1 uses frequencies $f_{11}$ and $f_{1k}$, and the user k uses the frequencies $f_{k1}$ and $f_{kM}$. As is obvious from the drawing, each user uses one or more frequency channels.

The transmitting device illustrated in FIG. 17A includes a transmitting unit 151 that generates a transmission signal for each user, shapes the pulse waveform, and transmits the signal. The transmitting unit 151 is provided with: a data generator and modulator 152 that generates data of information to be transmitted on each frequency channel and generates the transmission signal by modulating the signal by use of the data; a pulse shaping portion 153 that shapes the pulse waveform of the transmission signal; a D/A converter 154 that converts the shaped pulse waveform from a digital signal to an analog signal; an RF portion 155 that up-converts the analog baseband signal; and an antenna 156 that transmits the signal.

The transmitting unit 151 is provided with: a spectrum usage information and policy information acquiring portion 157; a pulse shape and symbol rate controller 158; and a center carrier frequency controller 159. The spectrum usage information and policy information acquiring portion 157 has a function of detecting the bandwidth of the frequency channel that is not currently being used and a function of acquiring usage status of other users frequency channels or a function of acquiring policy information on whether or not another user is provided with a function of removing ICI.

The spectrum usage information and policy information acquiring portion 157 is capable of acquiring the usage status or the policy information of the frequency channel with the following configuration. For instance, users are supposed to share the spectrum usage policy (such as a user class ID, and information on possibility or impossibility of overlapping with each user class) as defined by the policy information beforehand.

Each user is able to determine the signal strength, specifications, or presence or absence of an ICI removal function for adjacent frequency channels, by determining the user class from the spectrum of the adjacent frequency channel over the frequency. If the presence of the ICI removal function is determined, it is possible to allow the overlapping the frequency channel with the adjacent frequency channel.

In addition, in the fourth embodiment, it is possible to set a control channel beforehand so that users can exchange information. Such a configuration allows a user of an adjacent frequency channel to determine spectrum usage information and policy information; i.e., whether or not overlapping is allowed via the control channel.

Furthermore, a database may be provided for storing and updating the usage status of the spectrum or frequency usage policy sequentially. In the database, which user class uses which channel is registered, so that each user accesses the data to determine whether or not overlapping with an adjacent channel is possible.

The pulse shape and symbol rate controller 158 uses the bandwidth information of the frequency channel that is not currently being used and the spectrum usage information, which are acquired by the spectrum usage information and policy information acquiring portion 157 to determine the number of the frequency channels to be used for signal transmission, the center carrier frequency in each frequency channel, the symbol rate, and the pulse shape so as to determine the bandwidth of the frequency channel that is not currently being used.

The center carrier frequency controller 159 communicates with the RF portion 155 the center carrier frequency information of each frequency channel, which has been determined by the pulse shape and symbol rate controller 158, in multiple frequency channels to be used for signal transmission. The RF portion 155 up-converts the signal based upon the center carrier frequency information of each frequency channel that has been communicated from the center carrier frequency controller 159, and transmits the signal via the antenna 156.

With the above configuration, the pulse shape and symbol rate controller 158 serves as frequency channel determination means, overlap possibility or impossibility determination means, and pulse shaping type determination means.

Figure 18A:
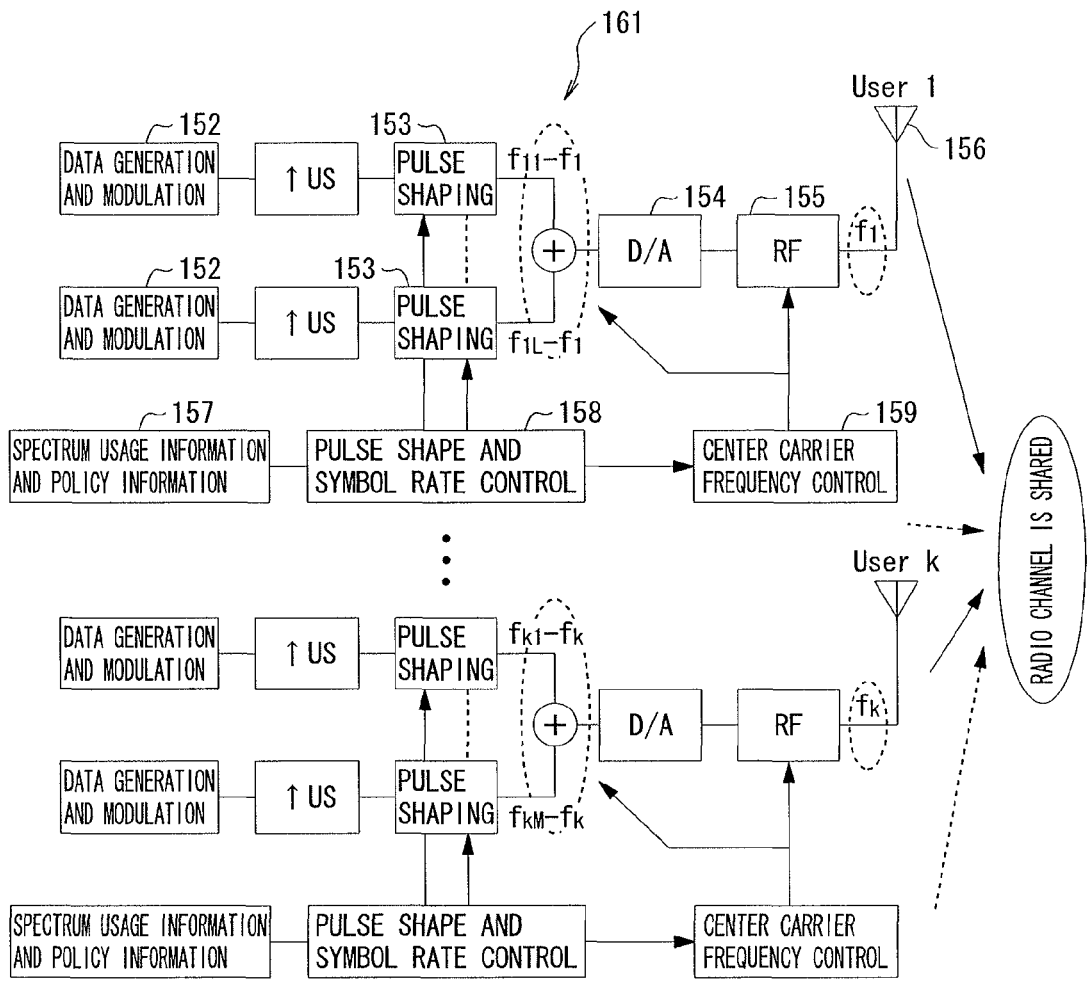
FIG. 18A and FIG. 18B are illustrations of another configuration example of the transmitting and receiving device illustrated in FIG. 17A and FIG. 17B.
Figure 18B:
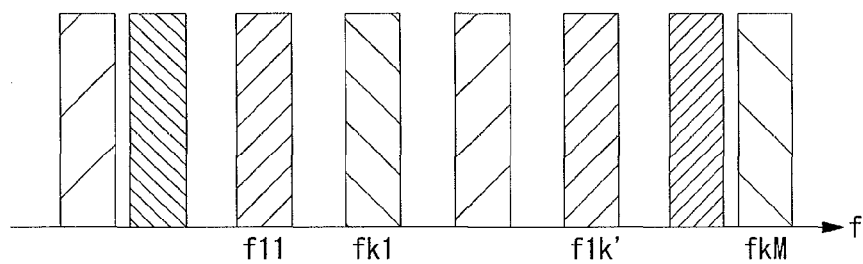

FIG. 18A is an illustration of another configuration example of the transmitting and receiving device illustrated in FIG. 17A. A transmitting unit 161 illustrated in FIG. 18A is provided with one D/A converter 154 and one RF portion 155 for a single user, and is different from the configuration of FIG. 17A in that they are shared by multiple frequency channels. According to the configuration illustrated in FIG. 18A, the number of parts is made smaller than that of the transmitting device illustrated in FIG. 17A, thereby producing advantages of downsizing of the device and cost reduction thereof.

FIG. 19 is a flowchart illustrative of the communication method according to the fourth embodiment. The transmitting device according to the fourth embodiment receives a request that a user who is not currently in communication (new user) utilizes the communication system for communication (S171). The spectrum usage information and policy information acquiring portion 157 determines availability status of the frequency channel, and also acquires the spectrum usage information (spectrum usage policy) (S172).

Also, the pulse shape and symbol rate controller 158 determines based upon the spectrum usage policy acquired by the spectrum usage information and policy information acquiring portion 157, whether or not it is possible to add overlapping with a frequency channel adjacent to the frequency channel determined to be available at step S172.

At step S173, when the overlapping is determined to be impossible (S173: No), the pulse shape and symbol rate controller 158 further determines whether or not the receiving device is provided with the ISI compensation functionality and it is therefore possible to compensate ISI when the ISI is introduced into the signal transmitted from the transmitting unit (S174). As a result of the determination, when the receiving side is not capable of compensating ISI (S174: No), the transmission signal is determined to have a pulse waveform (conventional pulse shape) into which ISI is not introduced same as in conventional case (S176).

Also, at step S174, when the receiving side is determined to be capable of compensating ISI (S174: Yes), the pulse shape and symbol rate controller 158 determines that the transmission signal should have the pulse waveform (proposed pulse shape (2)) described in the second embodiment of the present invention (S177).

Meanwhile, at step S173, when overlapping with an adjacent frequency channel is determined to be possible (S173: Yes), the pulse shape and symbol rate controller 158 determines whether or not the receiving device is provided with the ISI compensation functionality and it is therefore possible to compensate ISI when the ISI is introduced into the signal transmitted from the transmitting unit (S175).

As a result of the determination at step S175, when the receiving side is not capable of compensating ISI (S175: No), the transmission signal is determined to have a pulse waveform (proposed pulse shape (1)) that has been described in the first embodiment of the present invention (S178). Also, at step S175, when the receiving side is determined to be capable of compensating ISI (S175: Yes), the pulse shape and symbol rate controller 158 determines to make the transmission signal have the pulse waveform (proposed pulse shape (3)) that has been described in the third embodiment of the present invention (S179).

The pulse shape and symbol rate controller 158 determines the center carrier frequency and symbol rate of the transmission signal based upon the determined pulse waveform (S180).

The center carrier frequency controller 159 communicates such determined center carrier frequency with the RF portion 155. Then, necessary parameters out of the parameters determined by the receiving device are communicated and a communication is initiated (S181).

According to the fourth embodiment described above, it is made possible to make another frequency channel interfere with the signal transmitted by the transmitting device in accordance with the status, or make the transmission signals overlap with each other. Moreover, when the receiving side is capable of compensating ISI, the bandwidth of the frequency channel is made narrow by allowing ISI. It is therefore possible to provide a communication system, receiving device, and communication method, whereby usage efficiency of the spectrum is high and signal quality is not degraded, even if multiplexed users do not cooperate with each other.

INDUSTRIAL APPLICABILITY

The present invention is applicable to a communication system, transmitting device, receiving device, and communication method, to be applied to the environment where a single or multiple frequency channels are used without cooperation among multiplexed users.

The invention claimed is:

1. A communication system that communicates over frequency channels set by dividing a frequency bandwidth assigned to the system, the communication system comprising:
    a transmitting device that transmits a signal; and
    a receiving device that receives the signal transmitted from the transmitting device;
    the transmitting device comprising:
        a spectrum usage information and policy information acquiring portion that detects a bandwidth of a frequency channel that is not being currently used and determines usage status of the frequency channel;
        a pulse shape and symbol rate controller that determines whether it is possible to overlap the frequency channel that is not currently used with an adjacent frequency channel and whether it is possible to compensate for Inter-Symbol Interference (ISI) introduced into a signal to be transmitted from the transmitting device, in order to determine at least one of a center carrier frequency, a symbol rate, and a pulse shape, of the signal to be transmitted, based upon the determination results; and
        a center carrier frequency controller that controls a center carrier frequency of the signal to be transmitted with the use of a center carrier frequency determined by the pulse shape and symbol rate controller.

2. A transmitting device that transmits a signal over frequency channels set by dividing a frequency bandwidth assigned to a system, the transmitting device comprising:
    a spectrum usage information and policy information acquiring portion that has a function to detect a bandwidth of a frequency channel that is not being currently used and to determine usage status of the frequency channel; and
    a pulse shape and symbol rate controller that determines whether a user allows Inter-Symbol Interference (ISI) and whether an adjacent frequency channel for another user is interfered, based upon information acquired by the spectrum usage information and policy information acquiring portion, and that determines at least one of a center carrier frequency, a symbol rate, and a pulse shape, of a signal to be transmitted, based upon the determination results;
    wherein the signal generated based upon the determination results of the pulse shape and symbol rate controller is transmitted.

3. A method for communicating over frequency channels set by dividing a frequency bandwidth assigned to a system, the method comprising:
    acquiring information to detect a bandwidth of a frequency channel that is not being currently used and to determine usage status of the frequency channel;
    determining whether a user allows Inter-Symbol Interference (ISI) and whether an adjacent frequency channel for another user is interfered, based upon the information acquired in the acquiring; and
    controlling a determination of at least one of a center carrier frequency, a symbol rate, and a pulse shape, of a signal to be transmitted from a transmitting device, based upon the determination results in the determining.

* * * * *